United States Patent
Sumioka

(10) Patent No.: US 10,833,610 B2
(45) Date of Patent: Nov. 10, 2020

(54) CONTROL APPARATUS FOR VIBRATION-TYPE ACTUATOR, CONTROL METHOD FOR VIBRATION-TYPE ACTUATOR, VIBRATION-TYPE DRIVING APPARATUS, AND ELECTRONIC APPARATUS THAT IMPROVE ACCELERATION PERFORMANCE AND DECELERATION PERFORMANCE IN DRIVING VIBRATION-TYPE ACTUATOR

(71) Applicant: CANON KABUSHIKI KAISHA, Tokyo (JP)

(72) Inventor: Jun Sumioka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 358 days.

(21) Appl. No.: 15/715,549

(22) Filed: Sep. 26, 2017

(65) Prior Publication Data
US 2018/0097460 A1   Apr. 5, 2018

(30) Foreign Application Priority Data

Oct. 5, 2016  (JP) ................... 2016-197200
Jun. 30, 2017  (JP) ................... 2017-129431

(51) Int. Cl.
H02N 2/10 (2006.01)
H02N 2/14 (2006.01)
H02N 2/00 (2006.01)
H02N 2/16 (2006.01)

(52) U.S. Cl.
CPC .......... *H02N 2/106* (2013.01); *H02N 2/0065* (2013.01); *H02N 2/142* (2013.01); *H02N 2/147* (2013.01); *H02N 2/163* (2013.01)

(58) Field of Classification Search
CPC ...... H02N 2/106; H02N 2/0065; H02N 2/142; H02N 2/147; H02N 2/163
See application file for complete search history.

(56) References Cited

U.S. PATENT DOCUMENTS

| 6,150,749 A | 11/2000 | Tamai et al. |
| 7,116,033 B2 | 10/2006 | Seki et al. |
| 2007/0046144 A1* | 3/2007 | Urano ............ H02N 2/004 310/317 |

FOREIGN PATENT DOCUMENTS

| JP | H04140077 A | 5/1992 |
| JP | H05211785 A | 8/1993 |
| JP | 2000278966 A | 10/2000 |
| JP | 2003324974 A | 11/2003 |
| JP | 4478407 B2 | 6/2010 |

* cited by examiner

*Primary Examiner* — Derek J Rosenau
(74) *Attorney, Agent, or Firm* — Rossi, Kimms & McDowell LLP

(57) ABSTRACT

A control apparatus for a vibration-type actuator which improves acceleration performance and deceleration performance in driving the vibration-type actuator. The vibration-type actuator moves a vibrating body and a driven body relatively to each other. A vibration state of the vibrating body is detected based on a vibrating voltage or driving current generated in response to vibrations of the vibrating body. A relative speed of the vibrating body and the driven body is detected, and based on the detected vibration state and the detected relative speed, the vibration state of the vibrating body is controlled.

19 Claims, 15 Drawing Sheets

CONTROL APPARATUS FOR VIBRATION-TYPE ACTUATOR, CONTROL METHOD FOR VIBRATION-TYPE ACTUATOR, VIBRATION-TYPE DRIVING APPARATUS, AND ELECTRONIC APPARATUS THAT IMPROVE ACCELERATION PERFORMANCE AND DECELERATION PERFORMANCE IN DRIVING VIBRATION-TYPE ACTUATOR

BACKGROUND OF THE INVENTION

Field of the Invention

The present invention relates to a control apparatus for a vibration-type actuator, a control method for the vibration-type actuator, a vibration-type driving apparatus, and an electronic apparatus.

Description of the Related Art

A vibration-type actuator which brings a vibrating body and a driven body into pressure contact with each other and excite vibrations in the vibrating body to move the vibrating body and the driven body relatively to each other is known as a non-electromagnetically operated actuator. The vibrating body is constructed by, for example, joining an electro-mechanical energy conversion element such as a piezoelectric element to an elastic body. In the vibration-type actuator, alternating-current (AC) driving voltage is applied to the electro-mechanical energy conversion element to generate high-frequency vibrations in the vibrating body, and the generated vibration energy is taken as mechanical motions which are relative movements of the vibrating body and the driven body.

A variety of techniques to improve starting performance of an object to be driven have been proposed for equipment using the vibration-type actuator. For example, Japanese Patent Publication No. 4478407 proposes a control method that determines whether or not an actual speed has reached a reference speed when an amplitude of a voltage value output from a potential detecting sensor provided in the piezoelectric element has become greater than a predetermined value, and changes the rate of change in driving frequency based on the determination result. Also, Japanese Laid-Open Patent Publication (Kokai) No. H04-140077 proposes a control method that restrains frequency sweep when a voltage value output from a potential detecting sensor provided in the piezoelectric element at the time of starting has become equal to or greater than a predetermined value. Further, the vibration-type actuator may wear due to a slip occurring between the vibrating body and the driven body, and hence a technique to prevent such wear of the vibration-type actuator is proposed in, for example, Japanese Laid-Open Patent Publication (Kokai) No. 2003-324974. According to the technique proposed in Japanese Laid-Open Patent Publication (Kokai) No. 2003-324974, based on a relationship between driving command signals and vibration speeds set in advance, a vibration speed of a driving force transmitting member is obtained from a driving command signal, while positional information (detected speed) on a stage is obtained. After that, based on the vibration speed and the positional information (detected speed), an amount of slip of the stage and the driving force transmitting member as well as friction work are calculated. When the friction work exceeds a specification value prescribed in advance, control parameters for use in feedback to an ultrasonic motor are changed. Moreover, according to, for example, Japanese Laid-Open Patent Publication (Kokai) No. 2000-278966, to drivingly control the vibration-type actuator, an output from a driving frequency control circuit to which an output voltage from an electrode of the piezoelectric element is input is fed back to an oscillator to control driving frequency of the vibration-type actuator.

However, when the object to be driven needs to be rapidly accelerated or decelerated at high speed, desired acceleration or deceleration performance may not be obtained due to a slip occurring on a frictional sliding surface of the vibrating body and the driven body even if the prior art described above is used.

SUMMARY OF THE INVENTION

The present invention provides a control apparatus for a vibration-type actuator, a control method for the vibration-type actuator, a vibration-type driving apparatus, and an electronic apparatus that improve acceleration performance and deceleration performance in driving the vibration-type actuator.

Accordingly, the present invention provides a control apparatus for a vibration-type actuator which moves a vibrating body and a driven body relatively to each other, comprising a vibration detecting unit configured to detect a vibration state of the vibrating body based on a vibrating voltage or driving current generated in response to vibrations of the vibrating body, a relative speed detecting unit configured to detect a value that represent a relative speed of the vibrating body and the driven body, and a vibration control unit configured to control the vibration state of the vibrating body based on a detection result by the vibration detecting unit and a detection result by the relative speed detecting unit.

According to the present invention, acceleration performance and deceleration performance in driving the vibration-type actuator are improved.

Further features of the present invention will become apparent from the following description of exemplary embodiments with reference to the attached drawings.

DESCRIPTION OF THE EMBODIMENTS

Figure 1:
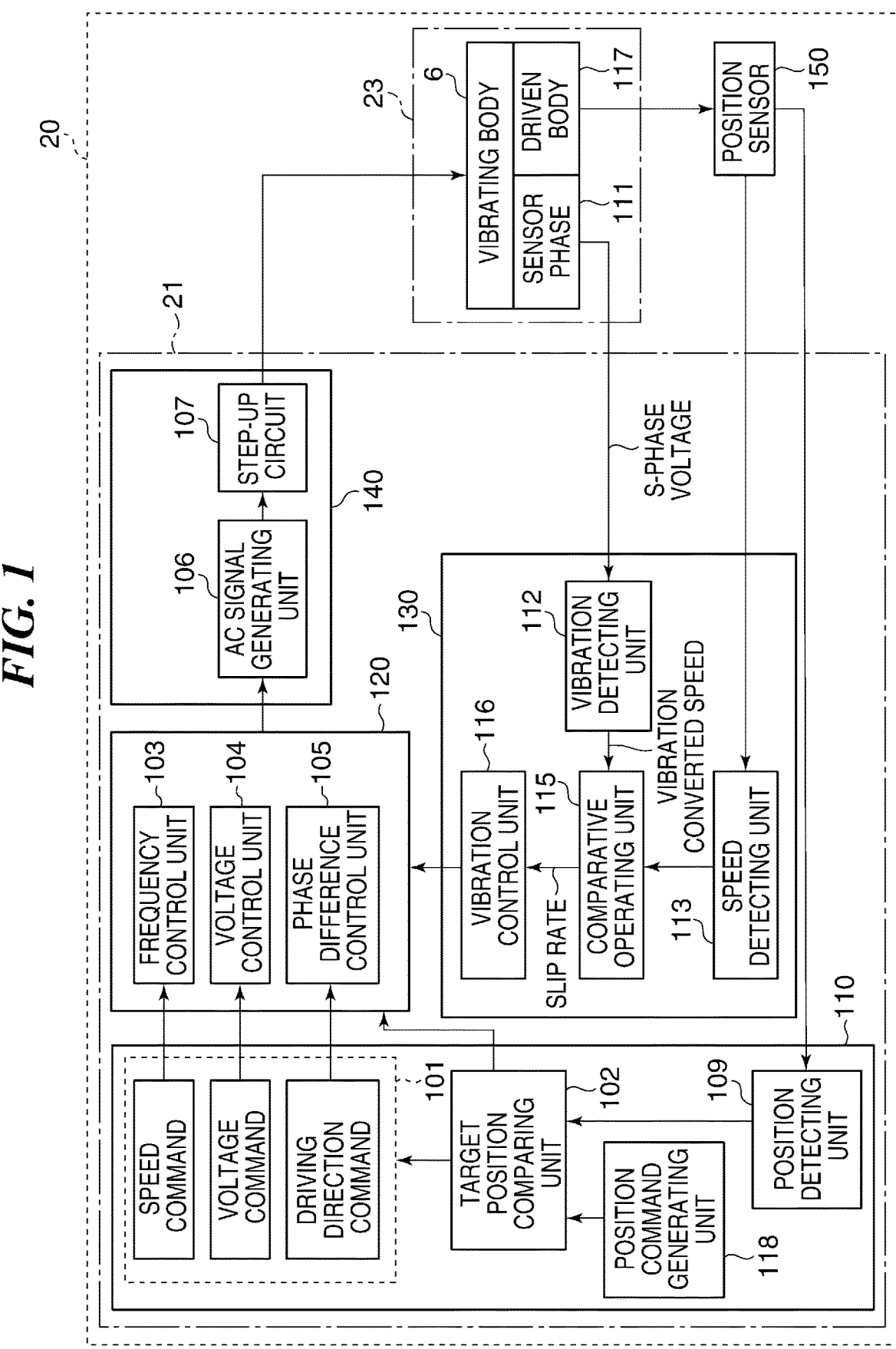
FIG. 1 is a block diagram schematically showing an arrangement of a vibration-type driving apparatus according to an embodiment of the present invention.

Hereafter, an embodiment of the present invention will be described with reference to the drawings. FIG. 1 is a block diagram schematically showing a vibration-type driving apparatus 20 according to an embodiment of the present invention. The vibration-type driving apparatus 20 has a vibration-type actuator 23, a control apparatus 21, and a position sensor 150. It should be noted that the position sensor 150 may be regarded as a constituent element of the control apparatus 21. The control apparatus 21 has a command unit 110, a control amount determination unit 120, a slip control unit 130, and a drive unit 140. The command unit 110 has a command value determination unit 101, a target position comparing unit 102, a position command generating unit 118, and a position detecting unit 109. The control amount determination unit 120 has a frequency control unit 103, a voltage control unit 104, and a phase difference control unit 105. The slip control unit 130 has a vibration control unit 116, a comparative operating unit 115, a vibration detecting unit 112, and a speed detecting unit 113. The drive unit 140 has an AC signal generating unit 106 and a step-up circuit 107. The vibration-type actuator 23 has a vibrating body 6, a driven body 117, and a sensor phase 111.

The control apparatus 21 has a CPU, a ROM, a RAM, electronic components, and electric components, and operation of the vibration-type actuator 23 is controlled by the CPU expanding programs stored in the ROM into the RAM and performing functions of the components constituting the control apparatus 21. It should be noted that the control apparatus 21 does not always have this arrangement, but may be comprised of a specific processor such as an ASIC which uses logic circuits to implement all or a part of processes performed by the components, and an electric circuit the operation of which is controlled by the specific processor. The components constituting the control apparatus 21 may be implemented by either software (programs) or hardware, or by a combination of software and hardware. In the present embodiment, the control apparatus 21 corresponds to a vibration detecting unit, a relative speed detecting unit, a vibration control unit, and a speed obtaining unit.

Figure 2A:
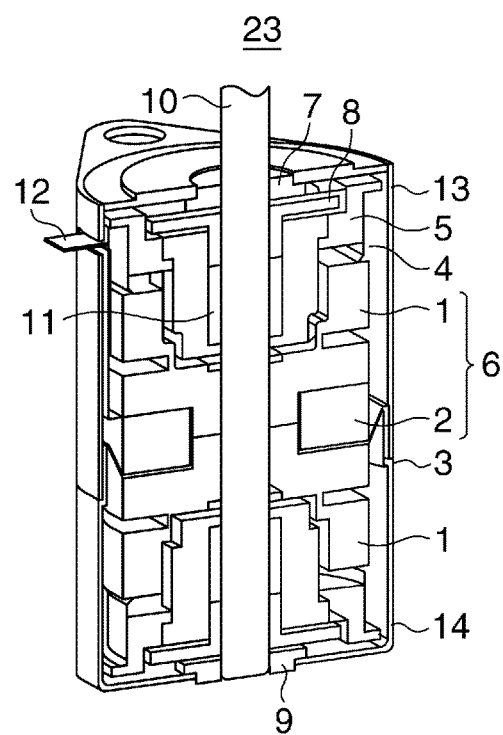
FIGS. 2A and 2B are cross-sectional views schematically showing a vibration-type actuator constituting the vibration-type driving apparatus.

First, a description will be given of an outline of an arrangement and a drive mode of the vibration-type actuator 23, which is an object to be drivingly controlled by the control apparatus 21. FIG. 2A is a cross-sectional view schematically showing the arrangement of the vibration-type actuator 23. The vibration-type actuator 23 taken up here generally produces circular or oval motions in a friction portion of a rod-shaped vibrating body and rotates a rotating body pressed against the friction portion, causing rotational output to be externally taken through an output shaft coaxial with the rotating body.

The vibration-type actuator 23 has a supporting member 3, a friction member 4, a rotating body 5, a vibrating body 6, case-side bearings 7 and 9, pressurized members 8, an output shaft 10, a pressure spring 11, a flexible printed wiring board 12, and cases 13 and 14. The vibrating body 6 has amplitude expanding members 1 (elastic body) and a piezoelectric element 2. The friction member 4, the rotating body 5, the pressurized members 8, the output shaft 10, and the pressure spring 11 constitute the driven body 117.

The vibrating body 6 has a rod-shaped (cylindrical) structure in which the piezoelectric element 2, which is an electro-mechanical energy conversion element, the flexible printed wiring board 12, and the supporting member 3 are sandwiched by the two amplitude expanding members 1. Each of the two amplitude expanding members 1 has a structure in which a vibrating body friction portion, a constricted portion, and a sandwiching portion are configured as an integral unit. The flexible printed wiring board 12 supplies power to the piezoelectric element 2. The supporting member 3 is sandwiched by the cases 13 and 14 forming an exterior of the vibration-type actuator 23, and this holds the vibrating body 6 at a predetermined position inside the cases 13 and 14. The output shaft 10 is inserted into a hole portion formed on an inner diameter side of the vibrating body 6. The output shaft 10 is pressed into and positioned in the case-side bearings 7 and 9 provided in the cases 13 and 14, respectively, and the vibrating body 6 is positioned with respect to the output shaft 10.

The rotating body 5 is in pressure contact with a friction portion of the vibrating body 6. When a plurality of AC voltages (driving voltages VA and VB in two phases, to be described later) is supplied to the piezoelectric element 2, two bending vibrations are combined together to produce oscillating motions at both ends of the vibrating body 6 in a direction of thrust. The oscillating motions produce circular or oval motions in a frictional sliding surface of a friction portion provided at the both ends (ends in an axial direction) of the vibrating body 6. On the other hand, the stepped friction member 4 made of stamped stainless steel and shaped like a pipe is joined to the rotating body 5 with an adhesive agent or by brazing or welding. End faces of the friction member 4 are pressed against the frictional sliding surface of the vibrating body 6 by pressure spring 11, and reaction force generated by the pressure spring 11 is received by the two pressurized members 8. Thus, the friction member 4 is frictionally driven by the circular or oval motions produced in the frictional sliding surface of the vibrating body 6 to rotate about the output shaft 10, causing the rotating body 5 to rotate. Rotational force of the rotating body 5 is transmitted to the output shaft 10 via a detent. At this time, since the pressurized members 8, the output shaft 10, and the detent are joined to one another via an adhesive agent, the rotational force of the rotating body 5 is reliably transmitted to the output shaft 10. It should be noted that the pressurized members 8, the output shaft 10, and the detent should not always be joined to one another with an adhesive agent, but they may be joined to one another by spot welding with laser or the like or by brazing.

The piezoelectric element 2 has the sensor phase 111 (see FIG. 1) which has a structure in which a piezoelectric material is sandwiched by electrodes. When AC voltage is applied to the piezoelectric element 2 to drive (vibrate) the piezoelectric element 2, AC voltage is generated in the sensor phase 111. Therefore, by monitoring a voltage value (hereafter referred to as an "S-phase voltage (vibration voltage)" and a phase of AC voltage output from the sensor phase 111, a vibration state (vibration displacement) of the vibrating body 6 is detected. It should be noted that even when the piezoelectric element 2 does not have the sensor phase 111, a vibrating state of the vibrating body 6 is detected by measuring a current (driving current) in the drive unit 140, to be described later. A circuit configuration for measuring the driving current will be described later.

The control apparatus 21 converts the S-phase voltage output from the sensor phase 111 into a rotational speed that is a speed when no slip is occurring between the vibrating body 6 and the driven body 117 (the frictional member 4) (rotational speed in a steady state), although this will be described later in detail. Here, as the piezoelectric element 2 increases in mechanical vibration displacement, the S-phase voltage rises. Therefore, when the S-phase voltage obtained by monitoring is high, this means that the piezoelectric element 2 undergoes a large mechanical vibration displacement, and the rotational speed in the steady state is high. It should be noted that in the following description of the present embodiment, the rotational speed in the steady state will be referred to as "the vibration converted speed (detection result)". The position sensor 150 is attached to the output shaft 10 (or a place where the output shaft 10 and an object to be driven are joined together), and an output signal from the position sensor 150 is used to detect an actual rotational speed of the driven body 117 (hereafter referred to as "the actual rotational speed (relative speed, detection result)") and a current position of the driven body 117. The current position of the driven body 117 means a rotational angle of the driven body 117 relative to the vibrating body 6 because in the present embodiment, the vibration-type actuator 23 rotationally drives the driven body 117. Based on a relationship between the rotational speed of the driven body 117 in the steady state and the actual rotational speed of the driven body 117, the control apparatus 21 detects a slip occurring between the vibrating body 6 and the driven body 117 (the frictional member 4). To reduce this slip, the control apparatus 21 controls a control amount for generating AC voltage to be supplied to the piezoelectric element 2.

Figure 2B:
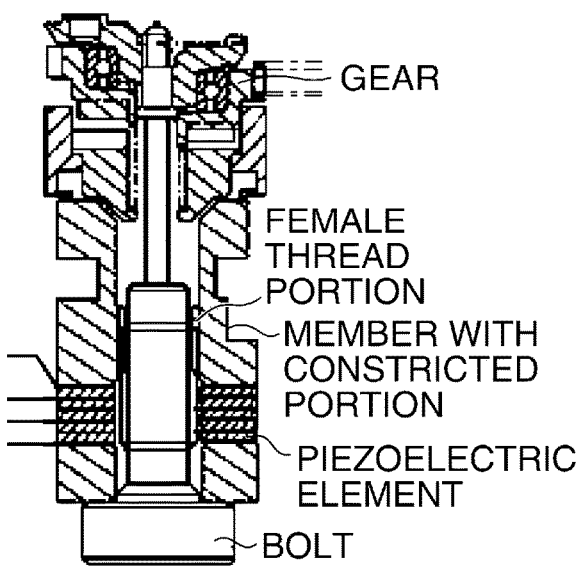

Vibration-type actuators that can be driven by the control apparatus 21 according to the present embodiment are not limited to those having the structure shown in FIG. 2A. FIG. 2B is a cross-sectional view schematically showing an arrangement of a well-known vibration-type actuator, which is disclosed in, for example, Japanese Laid-Open Patent Publication (Kokai) No. H05-211785. The vibration-type actuator in FIG. 2B has no output shaft, and hence output is externally taken through a gear.

The vibration-type actuator 23 can be used to drive, for example, a mirror, a shutter, and a lens provided in an image pickup apparatus such as a digital single-lens reflex camera. A description will now be given of an example in which the vibration-type actuator 23 is applied to driving of an instant return mirror in a digital single-lens reflex camera.

Figure 3A:
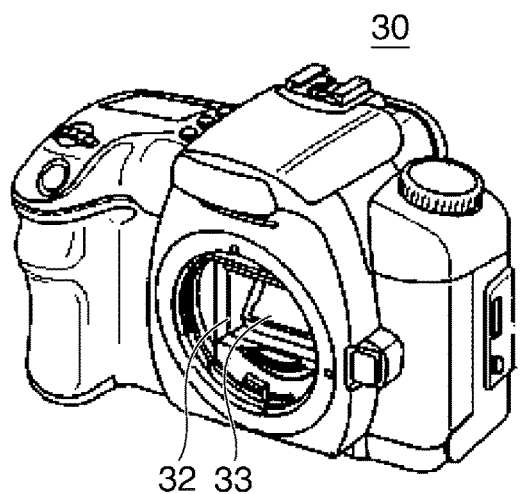
FIGS. 3A and 3B are an external perspective view and a cross-sectional view, respectively, showing a main body unit of a digital single-lens reflex camera.
Figure 3B:
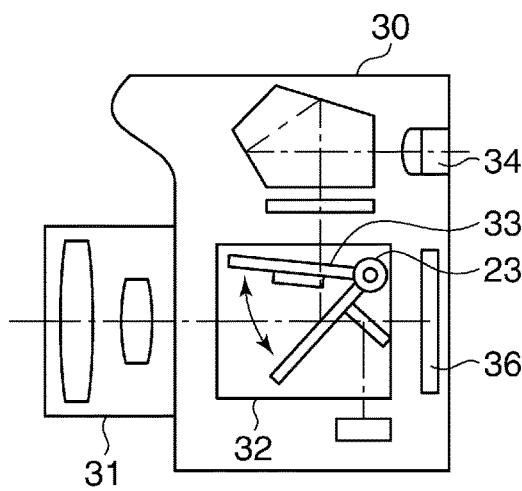

FIG. 3A is a perspective view showing an appearance of a main body unit 30 of the digital single-lens reflex camera. FIG. 3B is a cross-sectional view schematically showing an arrangement of the digital single-lens reflex camera. An interchangeable lens 31 (lens barrel) is removable from a mount provided on a front surface of the main body unit 30. A mirror box 32 to which a bundle of shooting rays having passed through the interchangeable lens 31 is guided is placed inside the main body unit 30, and a main mirror 33 (instant return mirror) is disposed inside the mirror box 32. An image pickup device 36 such as a CCD sensor or CMOS sensor is placed on a shooting optical axis of the interchangeable lens 31. The bundle of shooting rays having passed through the interchangeable lens 31 forms an optical image on a light-incident plane of the image pickup device 36. The optical image formed on the light-incident plane is converted into an electric signal through photoelectric conversion by the image pickup device 36 and then converted into image data by an image processing circuit, not shown, using a well-known technique.

When a photographer observes a subject image through a viewfinder eyepiece 34, the main mirror 33 disposed inside the mirror box 32 is held at a first position that forms an angle of, for example, 45 degrees with the shooting optical axis so as to guide the bundle of shooting rays to the viewfinder eyepiece 34. On the other hand, when the photographer depresses a shutter button and performs shooting, the main mirror 33 is held at a second position retracted from the bundle of shooting rays so as to guide the bundle of shooting rays to the image pickup device 36. To increase a frame speed at the time of shooting, the main mirror 33 needs to be switched between the first position and the second position at high speed.

A drive shaft of the main mirror 33 is connected to the output shaft 10 of the vibration-type actuator 23, and rotational driving force of the vibration-type actuator 23 moves the main mirror 33 back and force between the first position and the second position. On this occasion, a position and rotational speed of the main mirror 33 are controlled by controlling a rotational speed and rotational angle of the output shaft 10 thorough adjustment of frequency, voltage value, and phase difference of AC voltages applied to the piezoelectric element 2. The control apparatus 21 controls operation of the vibration-type actuator 23 such that the main mirror 33 accelerates from rest to a predetermined speed, moves at a constant speed, decelerates as it comes closer to a target position, and then stops at the target position. It should be noted that the drive shaft of the main mirror 33 may be connected to the vibration-type actuator 23 via a gear, a link mechanism, or the like.

A detailed description will now be given of an arrangement and operation of the control apparatus 21. In the following description, "driving the vibration-type actuator 23" means controlling changes in the actual rotational speed and position (rotational angle) of the driven body 117 by controlling two bending vibrations excited in the vibrating body 6. It should be noted that in the vibration-type actuator 23, the driven body 117 rotates whereas the vibrating body 6 is fixed as described earlier. Therefore, the actual rotational speed and position (rotational angle) of the driven body 117 are synonymous with a rotational speed and position (rotational angle) of the driven body 117 relative to the vibrating body 6.

The position sensor 150 which the vibration-type driving apparatus 20 has is, for example, an optical rotary encoder, which uses a reflective or through-beam type optical sensor to read a scale formed with a predetermined pitch in a circumferential direction on a lattice disk fixed to the output shaft 10. An output signal from the position sensor 150 is sent to the speed detecting unit 113 of the slip control unit 130. On the other hand, the S-phase voltage output from the sensor phase 111 is sent to the vibration detecting unit 112 of the slip control unit 130.

Based on the S-phase voltage output from the sensor phase 111, the vibration detecting unit 112 in the slip control unit 130 obtains the rotational speed (the rotational speed in the steady state) of the driven body 117 which is a speed when no slip is occurring between the vibrating body 6 and the friction member 4. Based on the output signal from the position sensor 150, the speed detecting unit 113 detects the actual rotational speed of the driven body 117. Based on the rotational speed of the driven body 117 in the steady state detected by the vibration detecting unit 112, and the actual rotational speed of the driven body 117 detected by the speed detecting unit 113, the comparative operating unit 115 calculates a rate of slip (detailed description thereof will be given later) occurring between the vibrating body 6 and the friction member 4. Based on the slip rate calculated by the comparative operating unit 115, the vibration control unit 116 in the slip control unit 130 controls at least one of a frequency, voltage, and phase difference of AC voltages supplied to the piezoelectric element 2 and sends a generated operating signal to the control amount determination unit 120.

The command unit 110 is comprised of various electronic devices and electric components such as a CPU or PLD (including an ASIC), a ROM, a RAM, and an AD converter and generates signals including information for controlling operation of the vibration-type actuator 23. Specifically, the position command generating unit 118 calculates a target position at control sampling intervals (time intervals). The output signal from the position sensor 150 is sent to the position detecting unit 109 of the command unit 110 as well, and based on the output signal from the position sensor 150, the position detecting unit 109 detects a current position of the driven body 117. The target position comparing unit 102 successively calculates a deviation between the current position calculated by the position detecting unit 109 and the target position calculated by the position command generating unit 118, and outputs the calculated deviation to the command value determination unit 101 and the control amount determination unit 120. Based on the deviation obtained from the target position comparing unit 102, the command value determination unit 101 outputs a speed command, a voltage command, and a driving direction command which have information on a speed, a voltage, and a driving direction, respectively, to the control amount determination unit 120. It should be noted that the command unit 110 may perform open operation in which it performs operation while maintaining starting initial values, and when the driven body 117 reaches the target position, turns off the power to stop driving the vibrating body 6, or may perform a feedback computation with a PID compensator or the like using the deviation.

The speed command, the voltage command, and the driving direction command determined by the command value determination unit 101 are sent to the frequency control unit 103, the voltage control unit 104, and the phase difference control unit 105, respectively, of the control amount determination unit 120. Based on the operating signal obtained from the slip control unit 130 and the command signal obtained from the command unit 110, the frequency control unit 103, the voltage control unit 104, and the phase difference control unit 105 in the control amount determination unit 120 determine frequency, voltage, and phase difference control amounts. The frequency, voltage, and phase difference control amounts determined by the control amount determination unit 120 are sent to the AC signal generating unit 106 of the drive unit 140.

The AC signal generating unit 106 is comprised of, for example, a CPU, a function generator, a switching circuit, and so forth, and adjusts frequency, pulse width, and phase difference of AC pulse signals for generating AC voltages which are supplied to the vibration-type actuator 23. It should be noted that in the following description, the AC voltages supplied from the drive unit 140 to the piezoelectric element 2 will be referred to as driving voltages VA and VB.

Based on the frequency, voltage, and phase difference control amounts input from the control amount determination unit 120, the AC signal generating unit 106 generates two-phase AC signals of rectangular waves and outputs the generated two-phase AC signals to the step-up circuit 107. By raising the voltage of the two-phase AC signals obtained from the AC signal generating unit 106 to a predetermined voltage, the step-up circuit 107 generates the driving voltages VA and VB and applies the generated driving voltages VA and VB to the piezoelectric element 2 of the driving body 6. As a result, vibrations in a predetermined vibration mode are excited in the vibrating body 6 to frictionally drive the driven body 117, enabling the driven body 117 to rotate in a predetermined direction at a predetermined speed.

It should be noted that as described earlier, the actual rotational speed and current position of the driven body 117 are obtained based on output from the position sensor 150, and hence the output signal from the position sensor 150 is fed back to the slip control unit 130 and also fed back to the command unit 110 as well. The S-phase voltage output from the sensor phase 111 is fed back to the slip control unit 130.

Figure 4A:
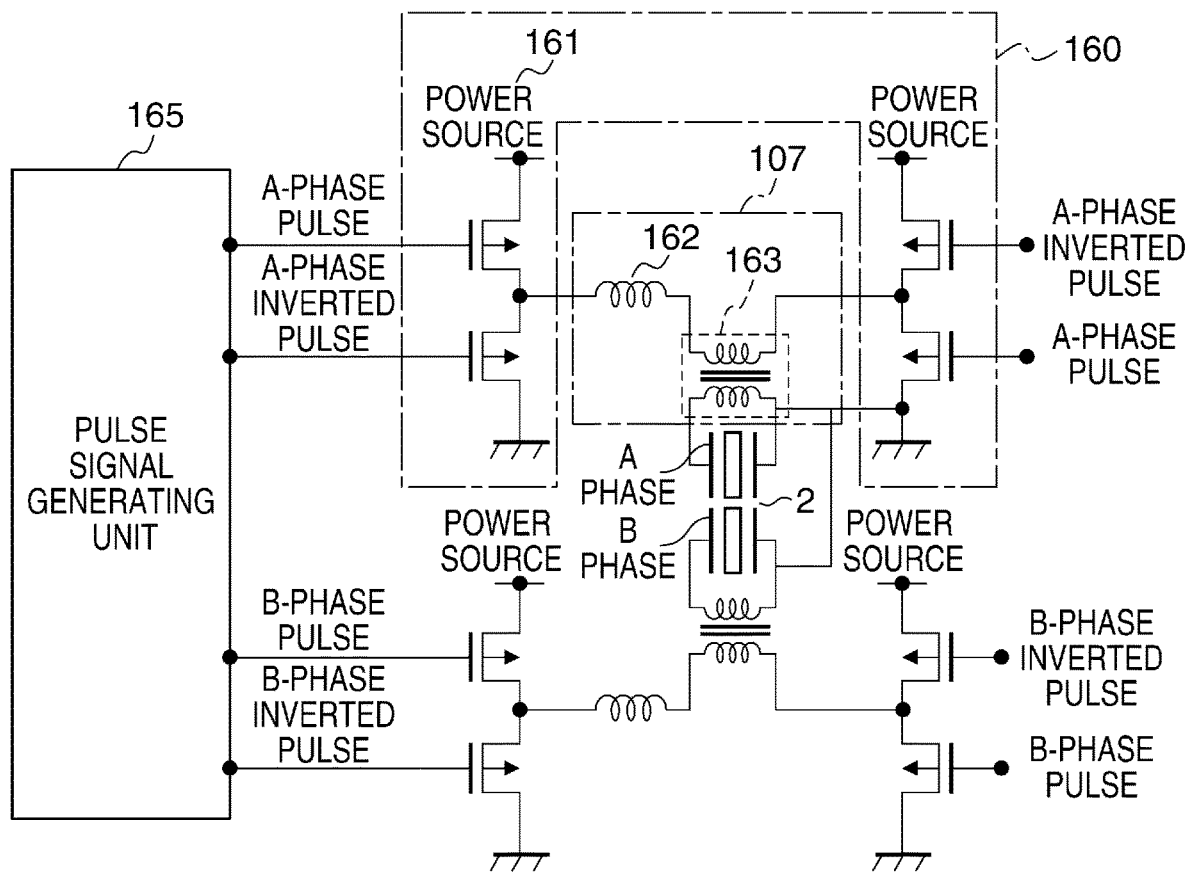
FIGS. 4A and 4B are diagrams useful in explaining a drive unit which a control apparatus constituting the vibration-type driving apparatus has.

A description will now be given of an arrangement of the drive unit 140. FIG. 4A is a block diagram schematically showing the arrangement of the drive unit 140. The AC signal generating unit 106 has a pulse signal generating unit 165 and a switching circuit 160. The step-up circuit 107 has a coil 162 and a transformer 163, but may be comprised of only the coil 162 or only the transformer 163. It should be noted that a part that generates the driving voltage VA and a part that generates the driving voltage VB have the same arrangement, and hence only the pulse signal generating unit 165 and the switching circuit 160 for use in generating the driving voltage VA will be described.

Figure 4B:
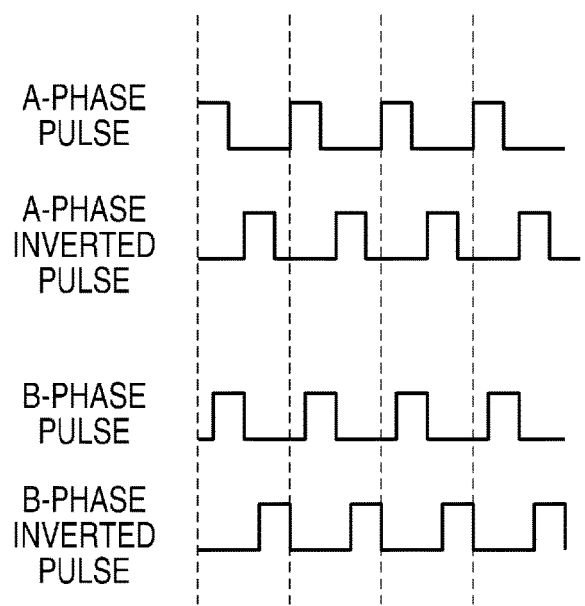

The pulse signal generating unit 165 generates a rectangular A-phase pulse signal, which corresponds to frequency, pulse width, and phase difference control amounts from the control amount determination unit 120, and an A-phase inverted pulse signal that is 180° out of phase with the A-phase pulse signal. FIG. 4B shows the pulse signals generated by the pulse signal generating unit 165. The A-phase pulse signal and the A-phase inverted pulse signal generated by the pulse signal generating unit 165 are input to the switching circuit 160. The switching circuit 160 causes switching of a DC voltage, which is supplied from a power source 161, at the input of a pulse signal to generate a rectangular-wave AC signal. It should be noted that when a pulse width of a pulse signal generated by the pulse signal generating unit 165 is expressed as a duty ratio, a pulse width of an AC signal generated by the AC signal generating unit 106 as well is expressed as a duty ratio.

The AC signal output from the AC signal generating unit 106 is input to the step-up circuit 107, which in turn boosts the voltage thereof to a predetermined voltage. As a result, the AC signal is converted into the sinusoidal driving voltage VA and applied to one electrode (A phase) of the piezoelectric element 2. It should be noted that a B-phase pulse signal for use in generating the driving voltage VB which is applied to the other electrode (B phase) of the piezoelectric element 2 is generated with a predetermined phase difference from that of the A-phase pulse signal based on phase difference information output from the control amount determination unit 120. A B-phase inverted pulse signal is 180° out of phase with the B-phase pulse signal. The sinusoidal driving voltage VB is generated in the same way as the driving voltage VA.

Figure 15A:
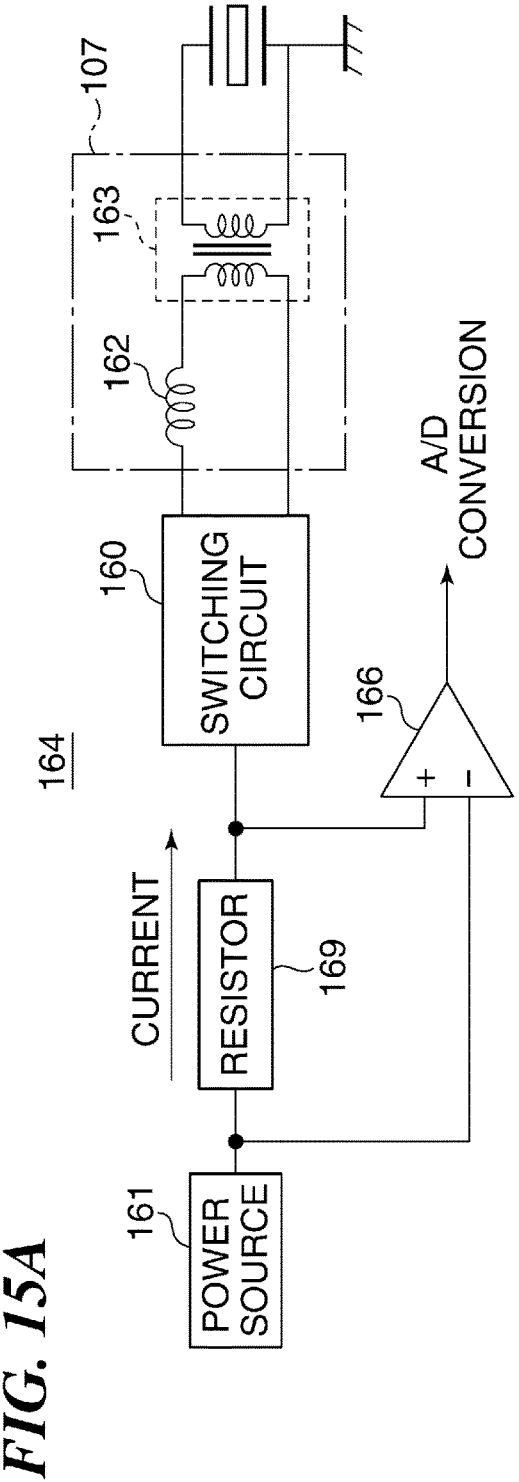
FIGS. 15A and 15B are circuit diagrams showing arrangements of current detecting circuits for detecting a vibration state of a vibrating body in the drive unit.
Figure 15B:
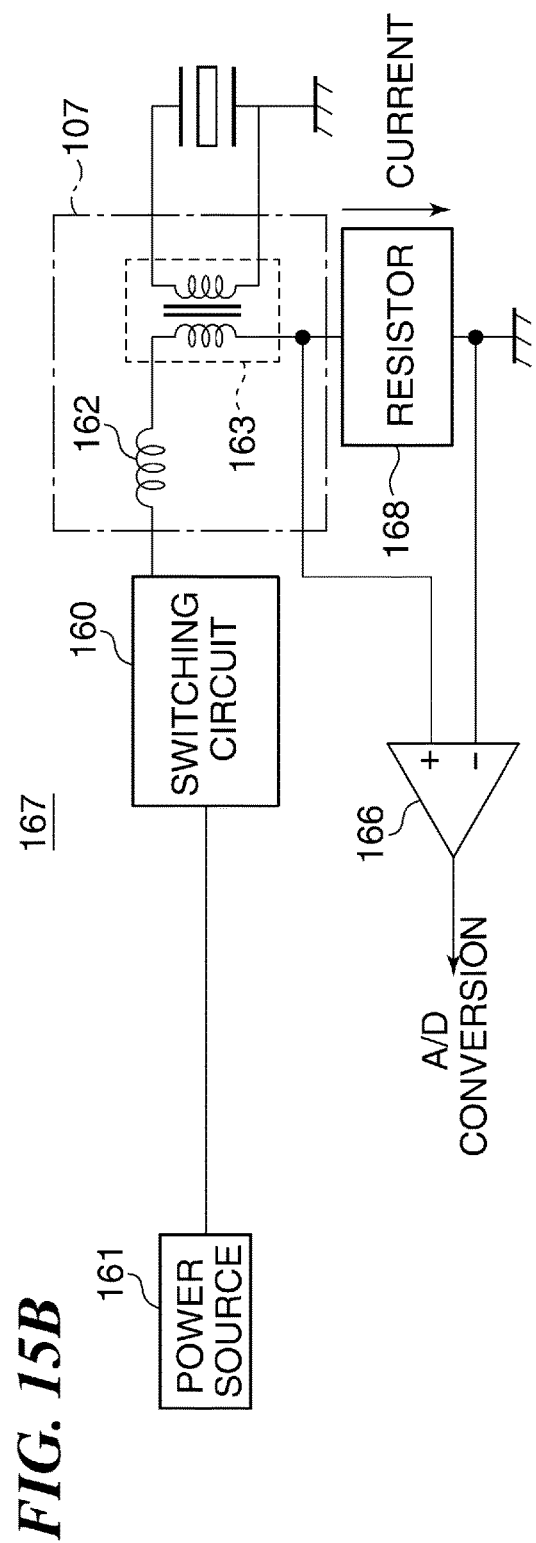

As described above, when the piezoelectric element 2 does not have the sensor phase 111, the drive unit 140 is equipped with a current detecting circuit for detecting driving current. For example, a current detecting circuit 164 shown in FIG. 15A detects a magnitude of a current passing through a resistor 169 provided between the power source 161 and the switching circuit 160. When the piezoelectric element 2 is driven by applying the driving voltages VA and VB to it, the magnitude of the current passing through the current detecting circuit 164 including the resistor 169 increases with magnitude of mechanical vibration displacement of the piezoelectric element 2. Therefore, by detecting a current value of the current passing through the resistor 169 from the power source 161, a vibration state (vibration displacement) of the vibrating body 6 is indirectly detected. The current is amplified using a differential amplifier 166 or the like and also subjected to A/D conversion and output to a control circuit. It should be noted that in the present embodiment, the current detected by the current detecting circuit 164 is defined as "driving current". In another example, a current detecting circuit 167 shown in FIG. 15B detects a magnitude of a current passing through a resistor 168 provided at one end of the step-up circuit 107. When the piezoelectric element 2 is driven by applying the driving voltages VA and VB to it, the magnitude of the current passing through a step-up coil (the transformer 163) increases with magnitude of mechanical vibration displacement of the piezoelectric element 2. Therefore, by detecting a current value of the current (driving current) passing through the resistor 168 connected to the transformer 163, a vibration state (vibration displacement) of the vibrating body 6 is indirectly detected. It should be noted that a resistor for detecting a current may be provided on a secondary side of the transformer 163. The resistor may be provided anywhere as long as a current passing through the current detecting circuit 167 can be detected. The detected driving current is amplified using the differential amplifier 166 or the like and also subjected to A/D conversion and output to a control circuit. The control circuit converts the driving current into a magnitude of mechanical vibration displacement of the piezoelectric element 2, and by extension the rotational speed in the steady state as with the S-phase voltage.

Figure 5:
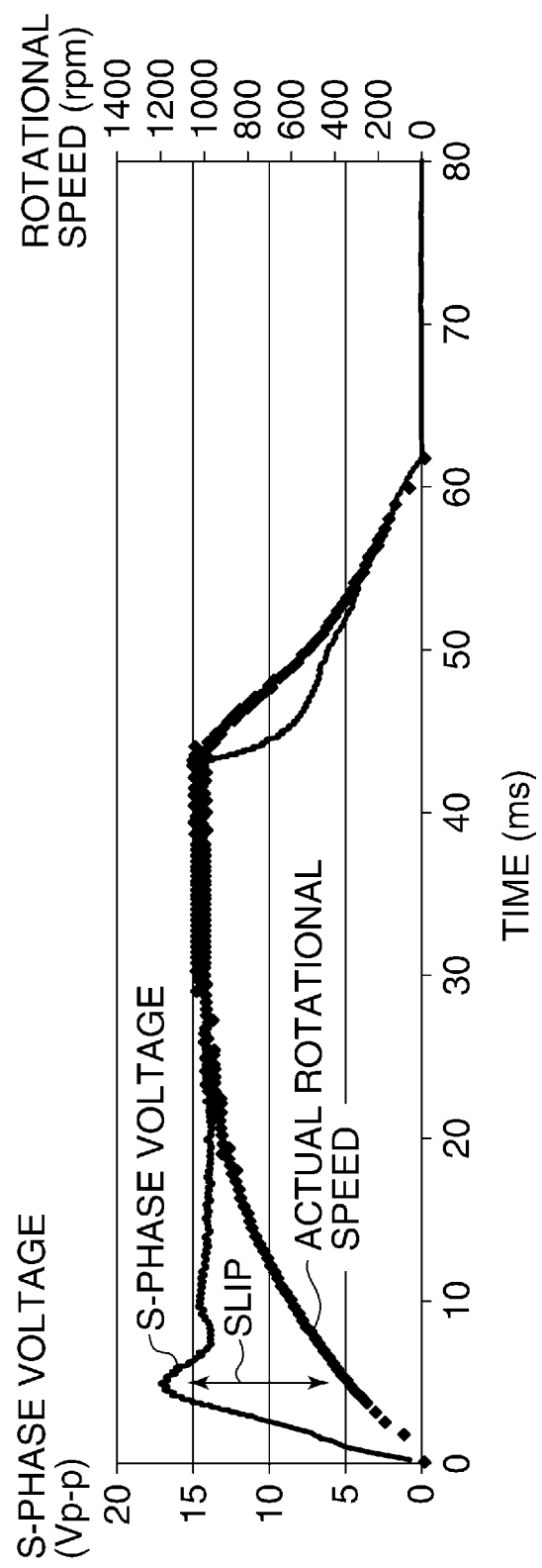
FIG. 5 is a graph showing driving characteristics of the vibration-type actuator when a conventional control method is used.

A description will now be given of how the control apparatus 21 controls the vibration-type actuator 23. First, a description will be given of a slip on the frictional sliding surface of the vibrating body 6 and the friction member 4. FIG. 5 is a graph showing a relationship between the rotational speed of the driven body 117 and the S phase voltage obtained from the sensor phase 111 when the vibration-type actuator 23 is controlled using a conventional control method. It should be noted that the rotational speed of the driven body 117 means the actual rotational speed of the driven body 117 (the output shaft 10) measured by the position sensor 150. In the graph of FIG. 5, the horizontal axis represents time, and the vertical axis represents S-phase voltage (Vp-p) and the rotational speed (rpm). Ranges of the two vertical axes are aligned so that the S-phase voltage and the rotational speed can match at 30 ms to 40 ms where the driven body 117 is in the steady state.

In an acceleration range and a deceleration range of the driven body 117, there is a difference between the S-phase voltage and the rotational speed of the driven body 117, and this difference is conspicuous in the acceleration range. This is because a slip occurs on the frictional sliding surface of the vibrating body 6 and the friction member 4 to inhibit a rise in the rotational speed of the driven body 117 although the vibrating body 6 has a sufficiently high vibration amplitude. When a slip occurs on the frictional sliding surface of the vibrating body 6 and the friction member 4, an excessive amount of power is consumed due to reduced efficiency, and hence peak power increases. To address this problem, the control apparatus 21 according to the present embodiment detects a slip occurring on the frictional sliding surface of the vibrating body 6 and the friction member 4 and controls operation of the vibration-type actuator 23 so as to reduce the occurrence of slips.

Figure 6A:
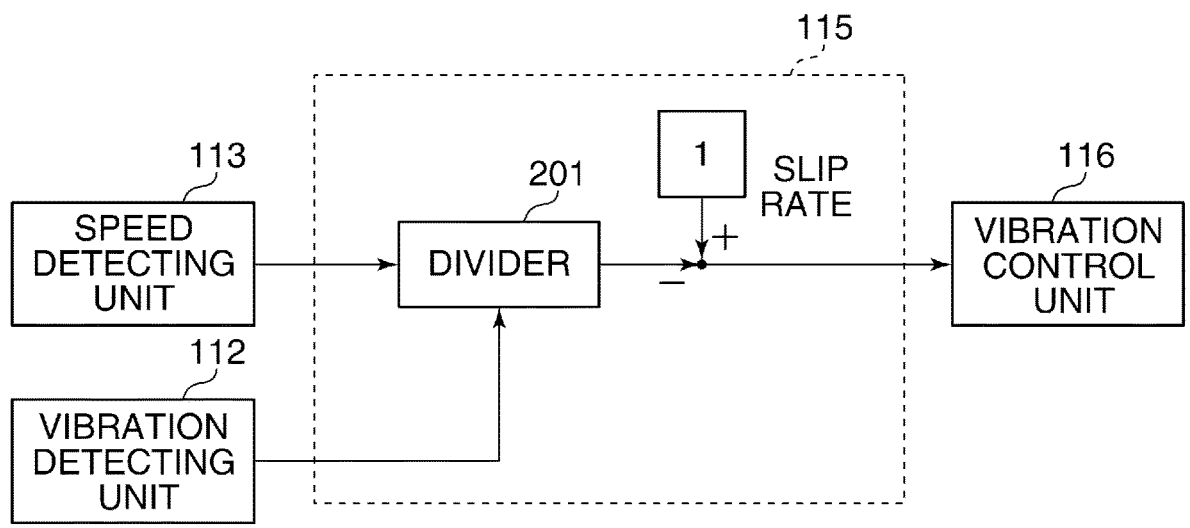
FIGS. 6A and 6B are diagrams useful in explaining a comparative operating unit which the control apparatus has.

FIG. 6A is a block diagram showing an arrangement of the comparative operating unit 115 included in the slip control unit 130 of the control apparatus 21. Based on output values from respective ones of the speed detecting unit 113 and the vibration detecting unit 112, the comparative operating unit 115 calculates a slip rate which is a value representing a slip on the frictional sliding surface of the vibrating body 6 and the friction member 4. The comparative operating unit 115 has a divider 201. The divider 201 divides the actual rotational speed by the vibration converted speed. The comparative operating unit 115 subtracts a value, which is obtained by dividing the actual rotational speed by the vibration converted speed, from 1 to calculate a slip rate using the following equation, "slip rate=1−(actual rotational speed/vibration converted speed)". The vibration converted speed, which is the output signal from the vibration detecting unit 112, corresponds to the rotational speed in the steady speed associated with a voltage value of the S-phase voltage which indicates a vibration state of the vibrating body 6. Namely, the vibration converted speed is the rotational speed of the driven body 117 with no consideration given to a slip on the frictional sliding surface of the vibrating body 6 and the friction member 4. Since the speed detecting unit 113 detects the actual rotational speed of the driven body 117 based on the output signal from the position sensor 150, the slip rate at the time of acceleration or deceleration is detected by finding a ratio between them. For example, when the actual rotational speed is equal to the vibration converted speed, the slip rate is 0%, which indicates a favorable driving state in which no slip is occurring. Conversely, when the actual rotational speed is zero (0), the slip rate is 100%, which indicates a state in which the vibrating body 6 cannot transmit driving force to the driven body 117.

Figure 6B:
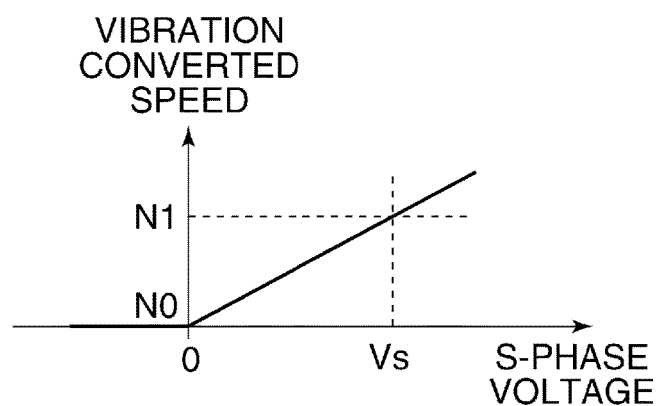

FIG. 6B is a diagram useful in explaining output from the vibration detecting unit 112. The vibration converted speed is calculated using an approximate expression based on the S-phase voltage input from the sensor phase 111, and for example, a calculation result is obtained as follows: "the vibration converted speed is N1 when the S-phase voltage is Vs". As described above, when the S-phase voltage is high, the piezoelectric element 2 undergoes a large amount of vibration displacement, which means that the vibration converted speed is high. Namely, the S-phase voltage and the vibration converted speed are generally proportional to each other, and hence a linear function as shown in FIG. 6B can be used as the approximate expression. It should be noted that as relational equations which express a relationship between the S-phase voltage and the vibration converted speed, a nonlinear approximate expression and a lookup table (LUT) may be used, and these relational equations are calculated based on measurement data obtained in advance. Here, an example of methods to calculate the vibration converted speed is that a relationship between a parameter (driving command signal), such as a frequency or voltage value of driving voltage for driving a vibrating body, and the vibration converted speed is set in advance, and based on this relationship, the vibration converted speed is calculated. However, the relationship between the parameter of the driving voltage and the vibration converted speed differs between a steady state in which a driven body is stable without being accelerated or decelerated and a transitional state in which a friction state of the driven body suddenly changes due to acceleration or deceleration. Therefore, when the vibration converted speed is calculated based on the parameter of the driving voltage, the calculated vibration converted speed may inaccurate depending on the friction state. On the other hand, in the present embodiment, the vibration converted speed is calculated based on the S-phase voltage (vibration voltage) which is different from the driving voltage and generated in response to vibration of the vibrating body 6. The S-phase voltage is determined only by vibration of the vibrating body 6, and hence the present embodiment has an advantage that the calculated vibration converted speed is accurate irrespective of the friction state. Moreover, when the driving current is detected using either of the current detecting circuits 164 and 167 in FIGS. 15A and 15B as well, there is an advantage that the calculated vibration converted speed is accurate irrespective of the friction state because the driving current is determined only by vibration displacement of the piezoelectric element 2. It should be noted that although in the present embodiment, the S-phase voltage is converted into the rotational speed and compared with the actual rotational speed as described above, the actual rotational speed may be converted into a voltage value corresponding to the S-phase voltage and compared with the S-phase voltage.

Figure 7A:
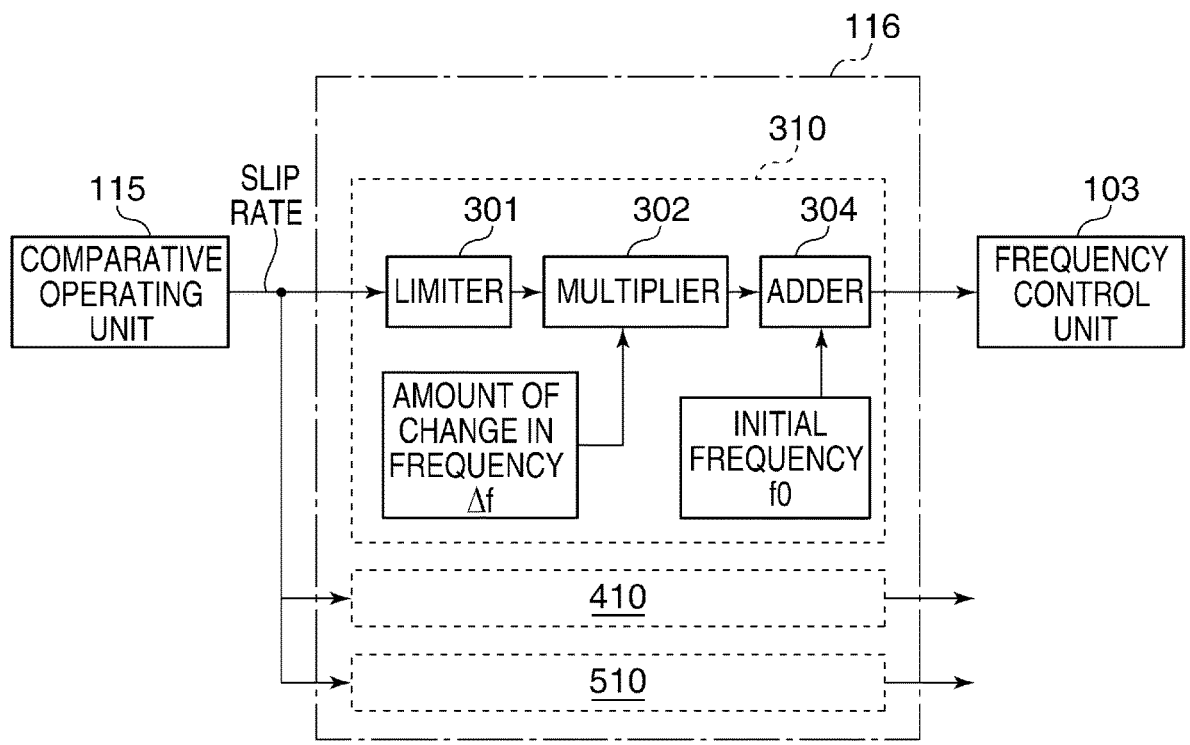
FIGS. 7A and 7B are diagrams useful in explaining a vibration control unit which the control apparatus has.
Figure 7B:
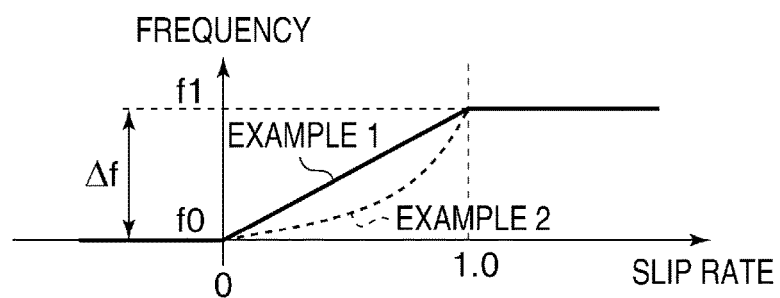
Figure 8A:
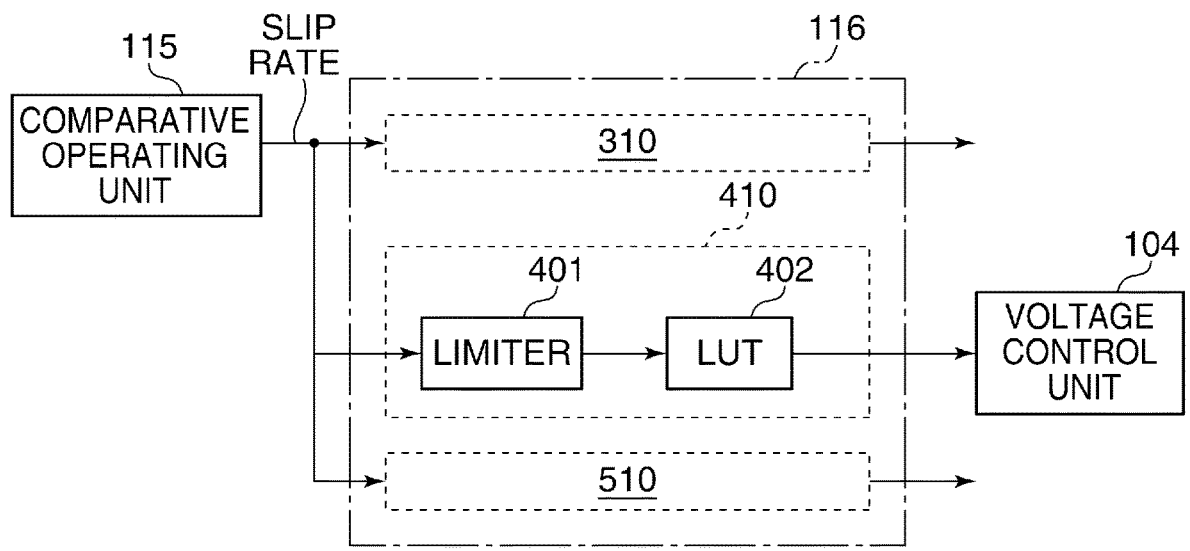
FIGS. 8A and 8B are diagrams useful in explaining the vibration control unit which the control apparatus has.
Figure 8B:
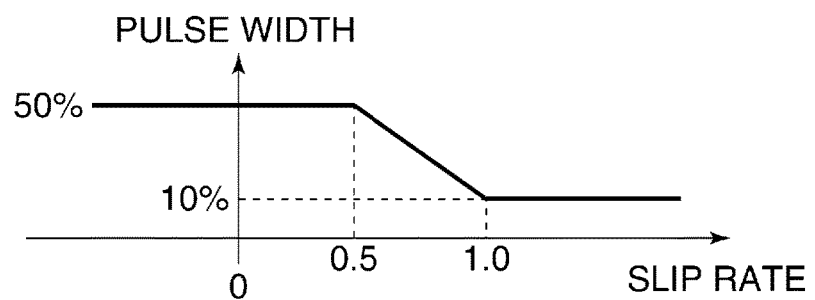
Figure 9A:
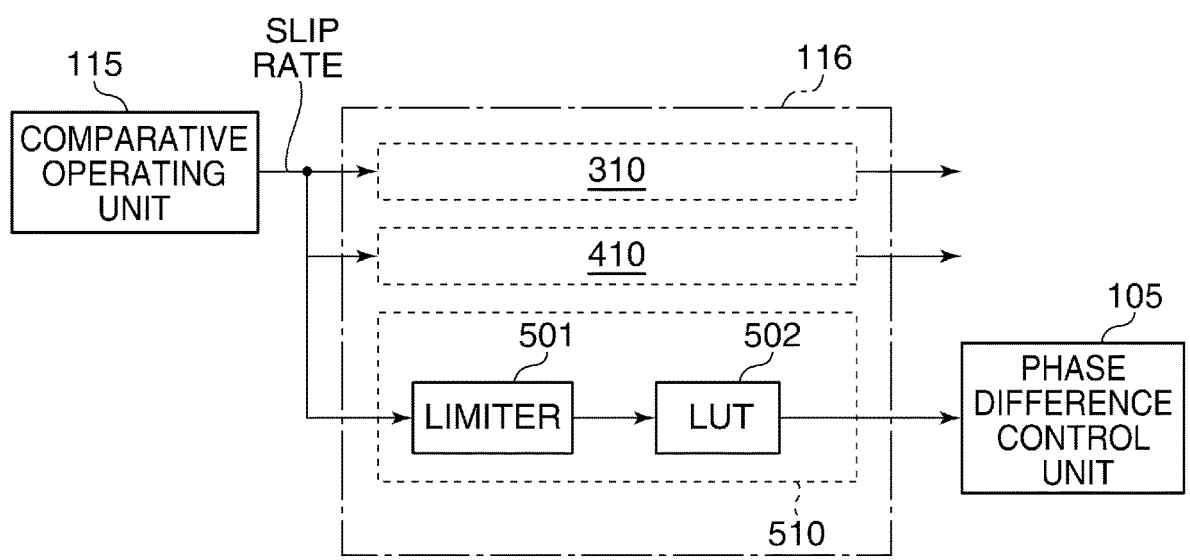
FIGS. 9A and 9B are diagrams useful in explaining the vibration control unit which the control apparatus has.
Figure 9B:
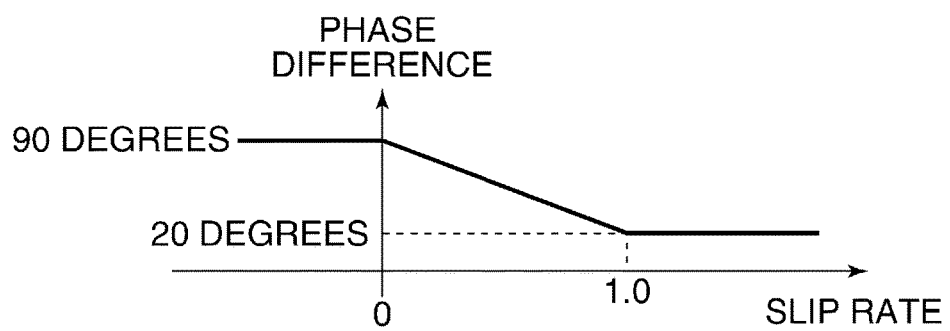

A description will now be given of control amounts generated by the vibration control unit 116 based on the slip rate calculated by the comparative operating unit 115. FIGS. 7A to 9B are diagrams useful in explaining an arrangement of the vibration control unit 116. By performing computations using the slip rate obtained from the comparative operating unit 115 as an input, the vibration control unit 116 outputs frequency, pulse width, and phase difference control amounts for generating the driving voltages VA and VB for use in driving the vibration-type actuator 23 to the control amount determination unit 120. To compute these control amounts, the vibration control unit 116 has a frequency computation unit 310, a pulse width computation unit 410, and a phase difference computation unit 510. FIGS. 7A and 7B are diagrams useful in explaining the frequency computation unit 310, FIGS. 8A and 8B are diagrams useful in explaining the pulse width computation unit 410, and FIGS. 9A and 9B are diagrams useful in explaining the phase difference computation unit 510. The following description will be given with reference to these figures.

FIG. 7A is a block diagram showing an arrangement of the frequency computation unit 310. The frequency computation unit 310 controls frequency based on the slip rate. The slip rate calculated by the comparative operating unit 115 is input to a limiter 301, which in turn outputs it as a value within a range of 0 to 1. A multiplier 302 multiplies the output value from the limiter 301 by an amount of change in frequency $\Delta f$ (=f1−f0). The amount of change in frequency $\Delta f$ is a value set in advance, and by controlling frequency within a range of an initial frequency f0 to a frequency f1, the rotational speed of the driven body 117 is controlled according to a slip. FIG. 7B is a diagram showing the amount of change in frequency $\Delta f$ which is output in association with the slip rate. A relationship between the slip rate and the amount of change in frequency $\Delta f$ may be either linear as shown in an example 1 or nonlinear as shown in an example 2. An adder 304 adds the amount of change in frequency $\Delta f$ to the initial frequency f0. Namely, the amount of frequency control falls within the range of the initial frequency f0 to the frequency f1 and is output to the frequency control unit 103 of the control amount determination unit 120. Here, as the frequency for generating the driving voltages VA and VB increases, the vibrations (rotational speed) of the vibrating body 6 decrease.

For example, when vehicle's tires start slipping on a freezing road surface, the slip is stopped by decreasing a rotational speed of the tires. In the present embodiment, this principle is used, and as shown in FIG. 7B, when the slip rate increases, the vibrations (rotational speed) of the vibrating body 6 are decreased by increasing the amount of change in frequency $\Delta f$ to increase frequency. This lowers the slip rate to improve transmission efficiency. When the slip rate has decreased, the amount of change in frequency $\Delta f$ is decreased to restrain, that is, reduce frequency increases. This increases the vibrations (rotational speed) of the vibrating body 6 to raise power. The S-phase voltage can be detected during either acceleration or deceleration of the vibrating body 6 and the driven body 117. Namely, even when the vibrating body 6 and the driven body 117 are in the transitional state, it is possible to detect the S-phase voltage. At this time, the S-phase voltage is successively detected, and based on the detected S-phase voltage, the slip rate is calculated to control frequencies for generating the driving voltages VA and VB as described above, and this improves efficiency of transitional motor performance. In this case, at predetermined sampling intervals or at intervals equivalent thereto while the driven body 117 is being driven, the S-phase voltage may be detected to calculate the slip rate, and based on the slip rate, the parameter of the driving voltages VA and VB may be controlled. This properly improves efficiency of motor performance.

During normal vibration-type actuator control, whether or not to change a PID gain for feedback control is determined by adjusting the PID gain or averaging slip rates during operation and comparing a result with a threshold level in every driving sequence comprised of acceleration, steady speed operation, and deceleration. Namely, the unit of driving voltage control is the unit of driving sequences. On the other hand, in the present embodiment, even during acceleration or deceleration of the vibrating body 6 and the driven body 117, the parameter of the driving voltages VA and VB is allowed to be controlled. Therefore, in the present embodiment, more efficient driving is possible than in the prior arts.

FIG. 8A is a block diagram showing an arrangement of the pulse width computation unit 410. The pulse width computation unit 410 controls voltage by adjusting pulse width based on the slip rate. The slip rate calculated by the comparative operating unit 115 is input to a limiter 401, which in turn outputs it as a value within a range of 0 to 1. An LUT 402 finds a pulse width based on the output value from the limiter 401 and outputs the pulse width to the voltage control unit 104 of the control amount determination unit 120. FIG. 8B is a diagram showing output values of pulse widths in accordance with slip rates. Basically, the output value of the pulse width becomes smaller as the slip rate increases, but for example, it is preferred that a pulse width of 50% is set for a slip rate of 0.5 or less, and a pulse width of 10% is set for a slip rate of 1.0. This is because a pulse width for obtaining a minimum voltage required to start the vibration-type actuator 23 is 10%, and if the pulse width is further decreased, a friction state of the frictional sliding surface of the vibrating body 6 and the friction member 4 would greatly change from a dynamic friction state to a stationary friction state.

FIG. 9A is a block diagram showing an arrangement of the phase difference computation unit 510. The phase difference computation unit 510 controls phase difference based on the slip rate. The slip rate calculated by the comparative operating unit 115 is input to a limiter 501, which in turn outputs it as a value within a range of 0 to 1. An LUT 502 finds a phase difference based on the output value from the limiter 501 and outputs the phase difference to the phase difference control unit 105 of the control amount determination unit 120. FIG. 9B is a diagram showing output values of phase differences in relation to slip rates. Basically, the output value of the phase difference becomes smaller as the slip rate increases. However, with consideration given to a nonlinear characteristic of the S-phase voltage with respect to the phase difference, it is preferred that, for example, a phase difference of 20 degrees is set for a slip rate of 1.0.

Figure 10A:
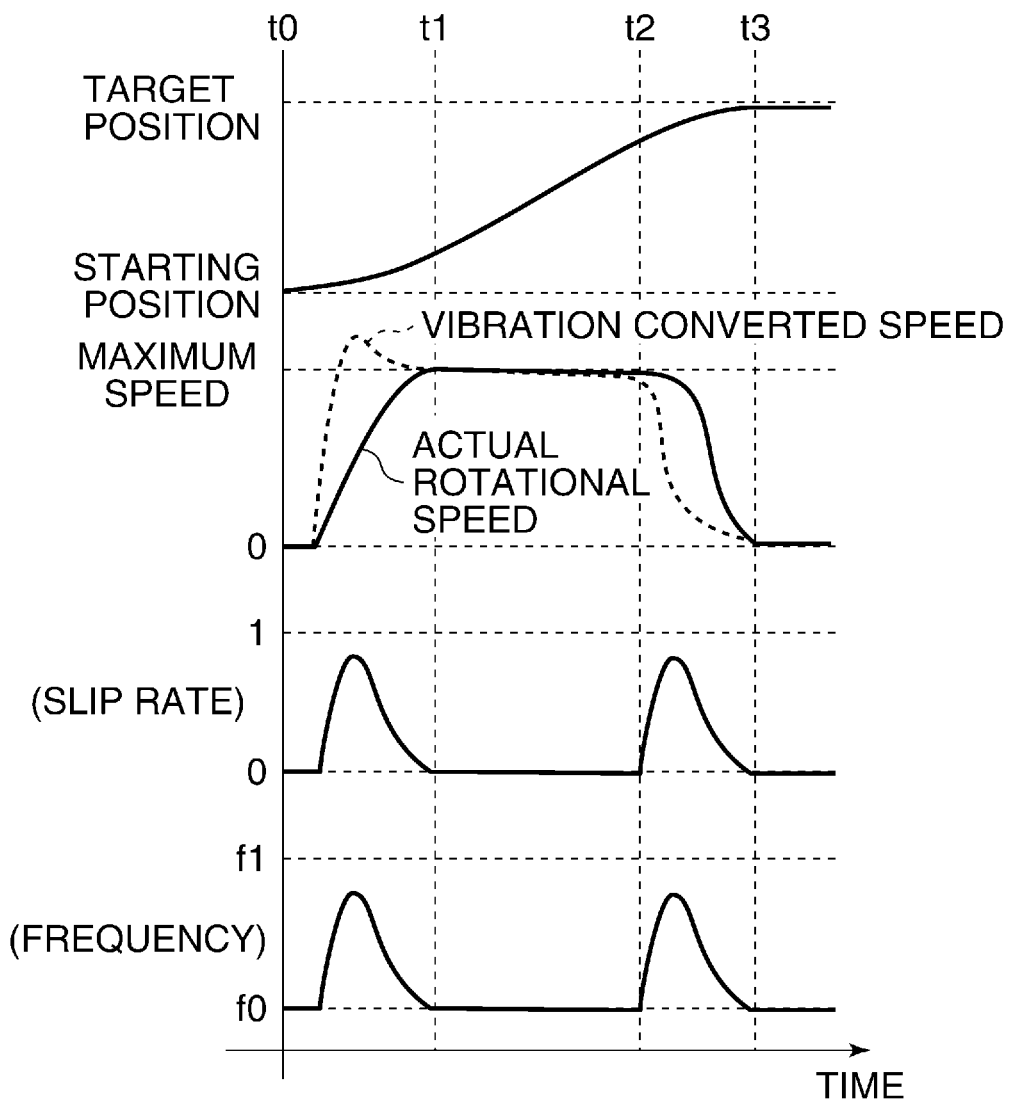
FIGS. 10A and 10B are timing charts in a case where frequency is controlled based on slip rate.
Figure 10B:
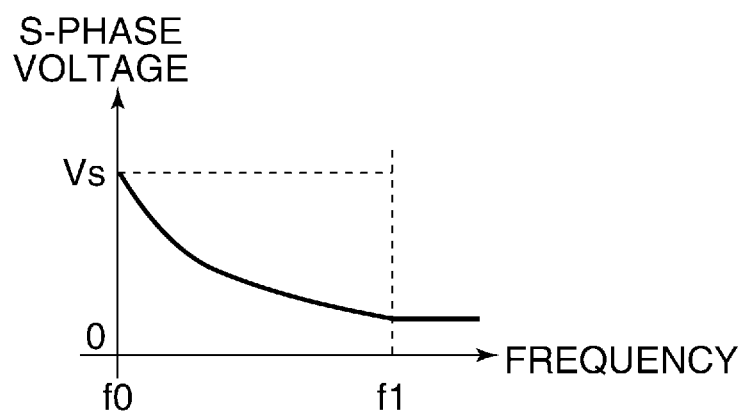

A description will now be given of timing charts relating to how the control apparatus 21 drivingly controls the vibration-type actuator 23. FIGS. 10A and 10B are timing charts in a case where frequency is controlled based on the slip rate. FIG. 10A shows variations with time in current position, actual rotational speed, slip rate, driving frequency (frequency of the driving voltages VA and VB) of the driven body 117. The vibration-type actuator 23 is controlled to start operating at a time t0, reach a target speed at a time t1, decelerate at a time t2, and reach a target position (target rotational speed) at a time t3. With attention being focused on the acceleration period from the time t0 to t1 and the deceleration period from the time t2 to t3, there is a difference between the vibration converted speed indicated by broken lines and the actual rotational speed indicated by a solid line due to a slip on the frictional sliding surface of the vibrating body 6 and the friction member 4. As a result, as described above, the comparative operating unit 115 calculates the slip rate, and the frequency computation unit 310 of the vibration control unit 116 controls the driving frequency so as to lower the slip rate. FIG. 10B shows a relationship between the S-phase voltage output from the sensor phase 111 and the frequency to be controlled. When the driving frequency is controlled toward the frequency f1 (the driving frequency is increased), the vibrations of the vibrating body 6 decrease, and therefore, the vibration converted speed as well decreases, lowering the S-phase voltage. Here, in view of the equation for calculating the slip rate, the state in which the slip rate is high simply means that the vibration converted speed is excessively high. Thus, in the present embodiment, when the slip rate is high, the driving frequency is controlled toward the frequency f1 to lower the vibration converted speed (decrease the vibrations of the vibrating body 6) so as to lower the slip rate. Namely, in the present embodiment, when the slip rate is high, the vibrations (rotational speed) of the vibrating body 6 are decreased by raising the frequency, and on the other hand, when the slip rate is low, the vibrations (rotational speed) of the vibrating body 6 are increased by lowering the frequency. Moreover, even during acceleration or deceleration of the vibrating body 6 and the driven body 117, the S-phase voltage is successively detected to calculate the slip rate, and based on the slip rate, the frequency for generating the driving voltages VA and VB is changed. This improves efficiency of translational motor performance. Furthermore, at predetermined sampling intervals or at intervals equivalent thereto while the driven body 117 is being driven, the S-phase voltage is detected to calculate a slip rate, and based on the slip rate, the parameter of the driving voltages VA and VB is controlled. This enables efficient driving while reducing the occurrence of slips.

Figure 11A:
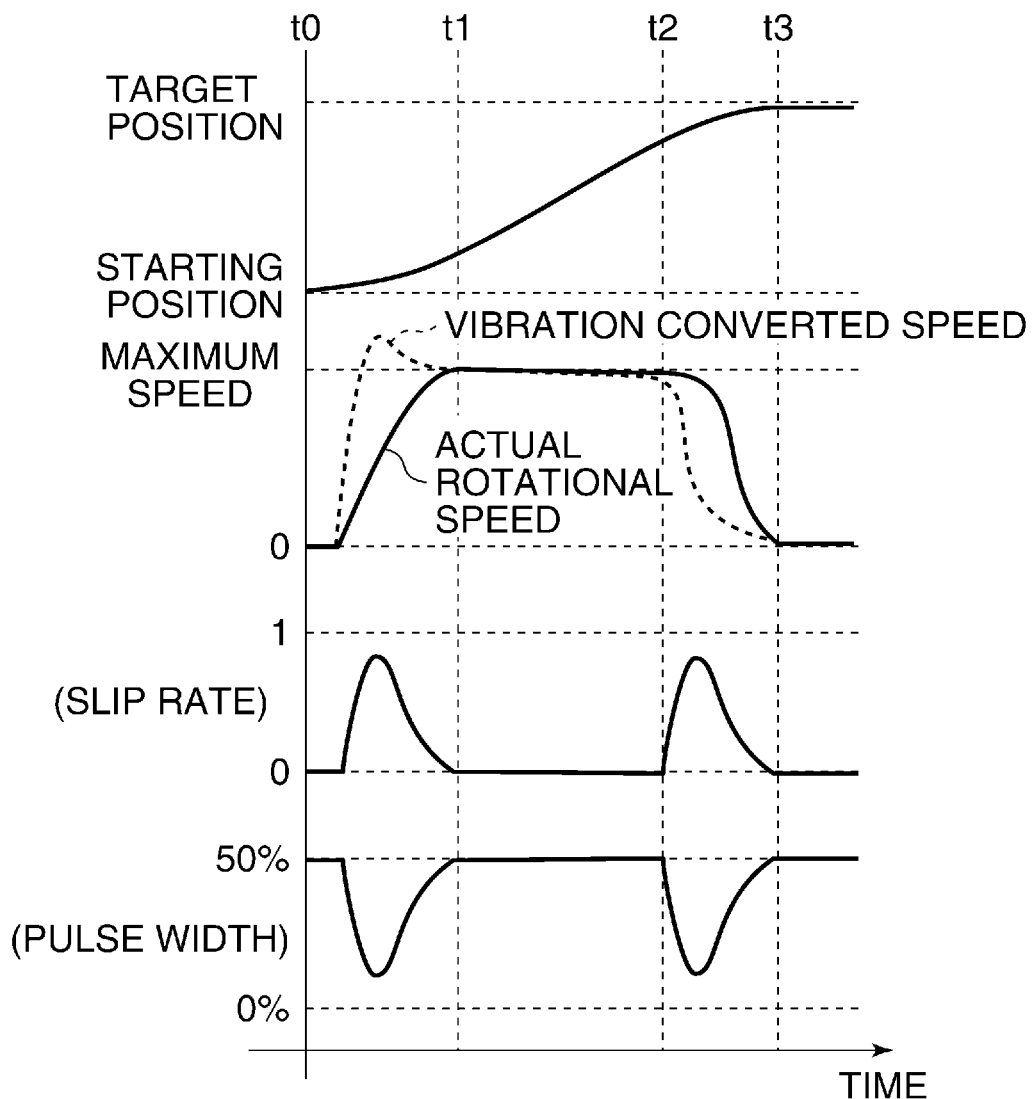
FIGS. 11A and 11B are timing charts in a case where pulse width is controlled based on slip rate.
Figure 11B:
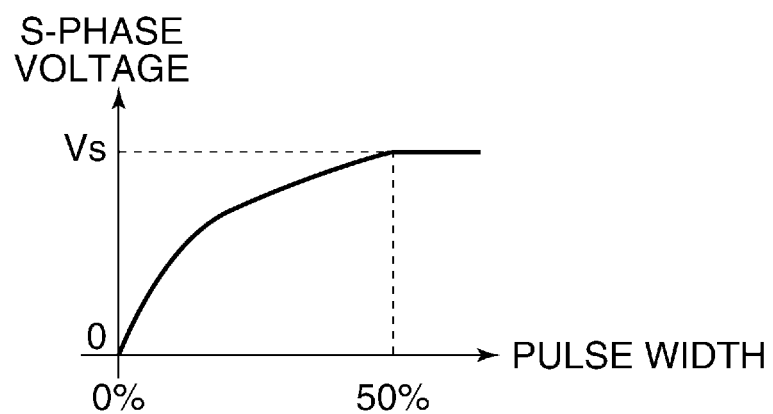

FIGS. 11A and 11B are timing charts in a case where the driving voltages VA and VB are controlled by adjusting pulse width based on the slip rate. FIG. 11A shows variations with time in current position, actual rotational speed, slip rate, and pulse width of the driven body 117. The variations with time in current position, actual rotational speed, slip rate, and pulse width of the driven body 117 in FIG. 11A are the same as those in FIG. 10A, and therefore, description thereof is omitted. When the comparative operating unit 115 calculates the slip rate, the pulse width computation unit 410 of the vibration control unit 116 controls pulse width so as to lower the slip rate. FIG. 11B shows a relationship between the S-phase voltage output from the sensor phase 111 and the pulse width to be controlled. When the pulse width is controlled toward 0%, the vibrations of the vibrating body 6 are decreased, and the vibration converted speed and the S-phase voltage lower as well. Thus, when the vibration converted speed is excessively high, and the slip rate is high, the pulse width is controlled toward 0% so as to decrease the vibration converted speed (reduce the S-phase voltage) and lower the slip rate. It is, however, preferred that the pulse width is not less than 10% as described above.

Figure 12A:
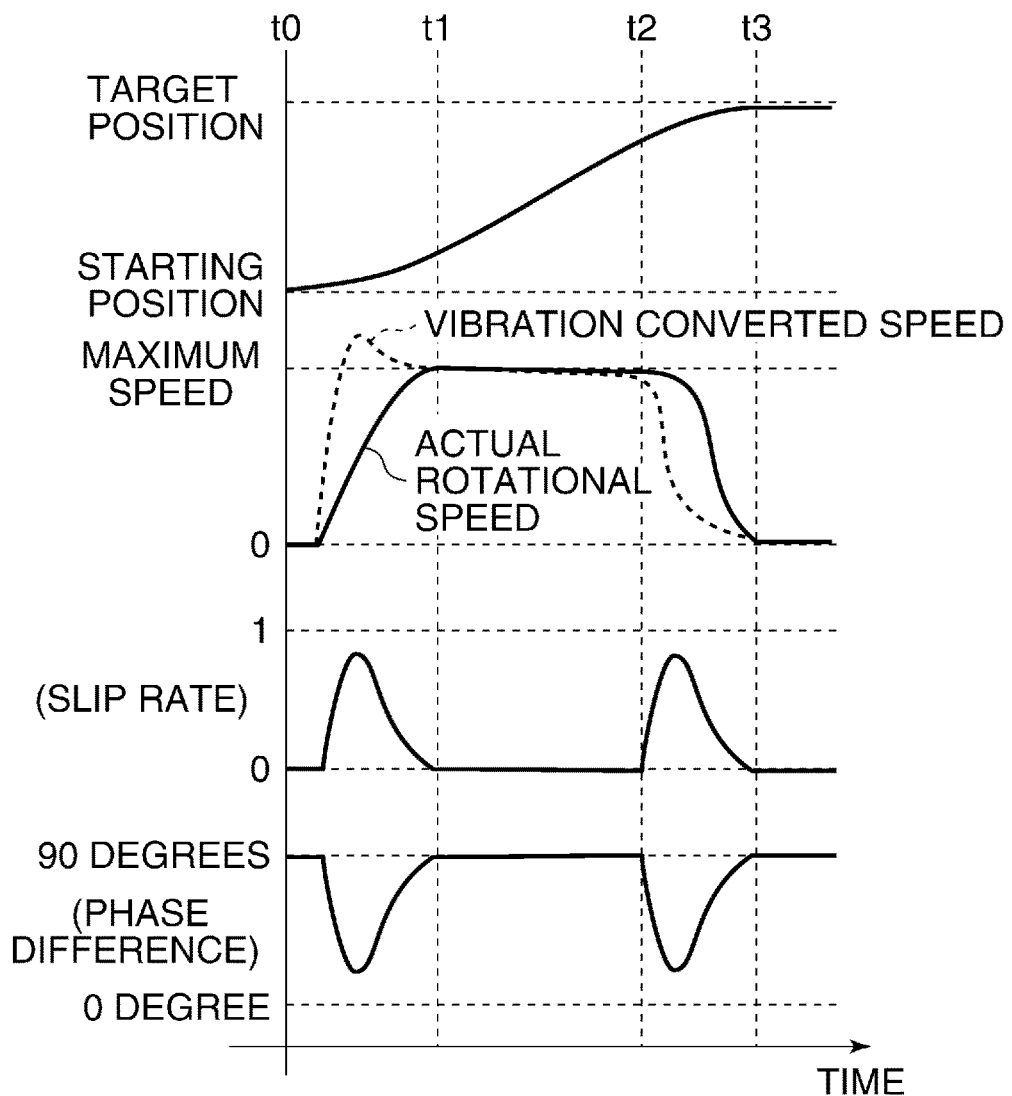
FIGS. 12A and 12B are timing charts in a case where phase difference is controlled based on slip rate.
Figure 12B:
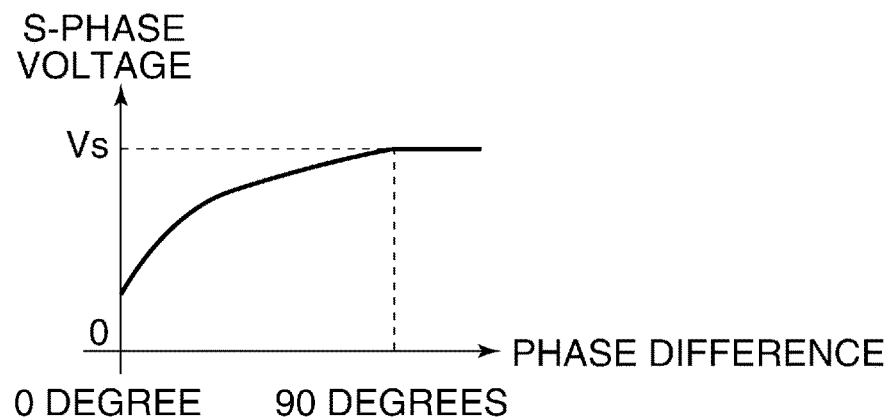

FIGS. 12A and 12B are timing charts in a case where phase difference is controlled based on the slip rate. FIG. 12A shows variations with time in current position, actual rotational speed, slip rate, and phase difference of the driven body 117. The variations with time in current position, actual rotational speed, slip rate, and phase difference of the driven body 117 in FIG. 12A are the same as those in FIG. 10A, and therefore, description thereof is omitted. When the comparative operating unit 115 calculates the slip rate, the phase difference computation unit 510 of the vibration control unit 116 controls phase difference so as to lower the slip rate. It should be noted that the phase difference at the start of the vibration-type actuator 23 should not necessarily be 90 degrees but may be 80 or 100 degrees. FIG. 12B shows a relationship between the S-phase voltage output from the sensor phase 111 and the phase difference to be controlled. When the phase difference is controlled toward zero degree, vibrations that move the driven body 117 forward in the driving direction are decreased, and the vibration converted speed lowers as well. At this time, the S-phase voltage which represents the vibrations decreases. Thus, when the vibration converted speed is excessively high, and the slip rate is high, the phase difference is controlled toward zero degree so as to decrease the vibration converted speed (reduce the S-phase voltage) and lower the slip rate.

It should be noted that the vibration control unit 116 may be configured to use all of the frequency computation unit 310, the pulse width computation unit 410, and the phase difference computation unit 510, or may be configured to use at least one of these computation units. Namely, the slip control unit 130 may be configured to control one of the frequency, the pulse width, and the phase difference based on the slip rate or may be configured to control them in combination.

Figure 13:
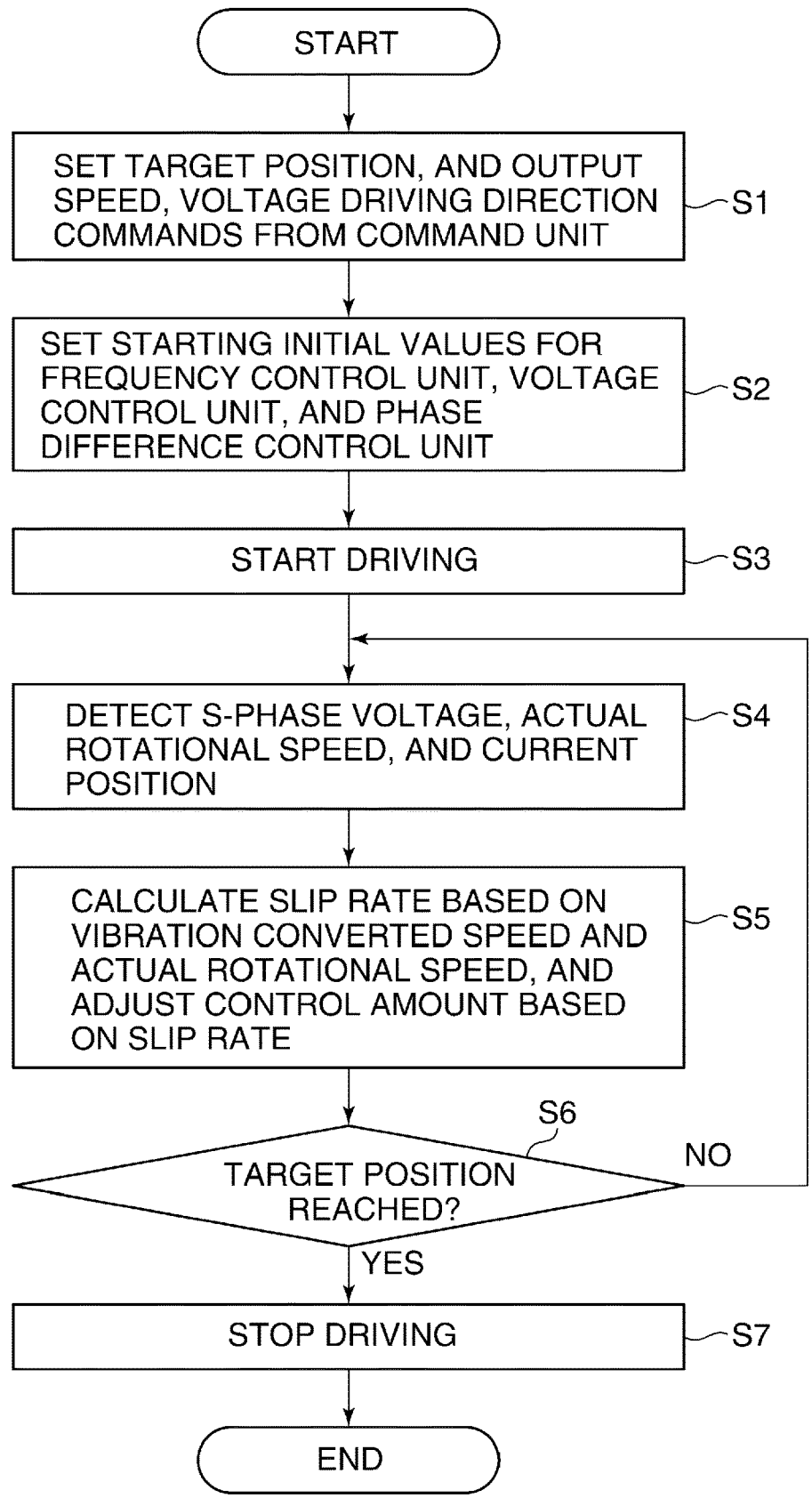
FIG. 13 is a flowchart useful in explaining how the control apparatus controls the vibration-type actuator.

FIG. 13 is a flowchart useful in explaining how the control apparatus 21 controls the vibration-type actuator 23. As described above, the control apparatus 21 has the CPU, the ROM, the RAM, and so forth, and processes in FIG. 13 are implemented by the CPU expanding programs stored in the ROM into the RAM to control operation of the components of the control apparatus 21.

In step S1, a target position (targeted rotational speed) of the driven body 117 is set, and command values having information on a speed, a driving voltage, and a driving direction are output from the command unit 110. In step S2, based on the command values, starting initial values are set in the frequency control unit 103, the voltage control unit 104, and the phase difference control unit 105. In step S3, the driving voltages VA and VB are applied from the drive unit 140 to (the piezoelectric element 2 of) the vibration-type actuator 23, causing driving of the driven body 117 to be started. In step S4, an S-phase voltage output from the sensor phase 111 provided in the vibration-type actuator 23 is detected, and based on an output signal from the position sensor 150, the actual rotational speed and current position of the driven body 117 are detected. In step S5, based on the vibration converted speed and the actual rotational speed calculated based on the information obtained in the step S4, the slip control unit 130 calculates the slip rate, and based on the calculated slip rate, the control amount is adjusted. In step S6, the command unit 110 compares the target position and the current position together to judge whether or not the target position has been reached. When it is judged that the target position has not been reached (NO in S6), the process returns to the step S4, and when it is judged that the target position has reached (YES in S6), the process proceeds to step S7. In the step S7, the drive unit 140 stops outputting the driving voltages VA and VB, causing the driven body 117 to stop.

FIG. 14A to 14F are diagrams showing test results obtained when the vibration-type actuator 23 was driven using the control apparatus 21 and a conventional control apparatus. Driving conditions for the vibration-type actuator 23 were that the power source 161 was 18 V, the initial frequency f0 was 37.4 kHz, the pulse width was 50%, and the phase difference was 90 degrees. It should be noted that to obtain the test results in FIG. 14A to 14F, the vibration converted speed was calculated by detecting the S-phase voltage, but the vibration converted speed may be calculated by detecting the driving current so as to obtain the test results as shown in FIG. 14A to 14F.

Figure 14A:
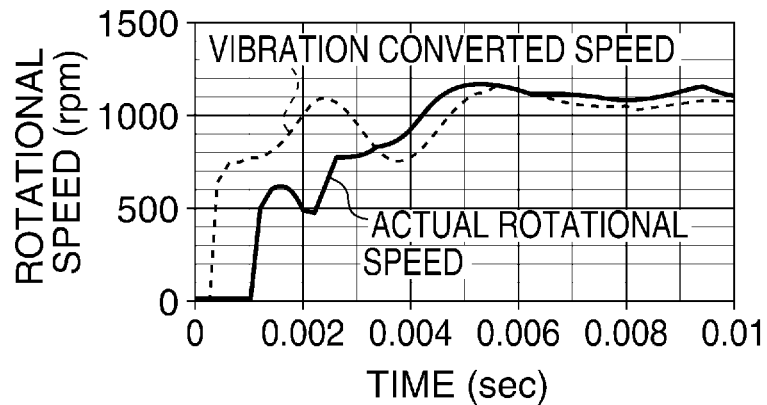
FIG. 14A to 14F are diagrams showing results of driving tests on the vibration-type actuator in a comparative example and an example.
Figure 14B:
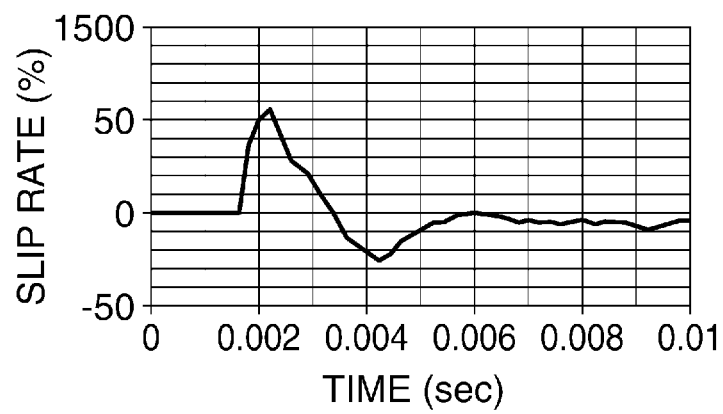
Figure 14C:
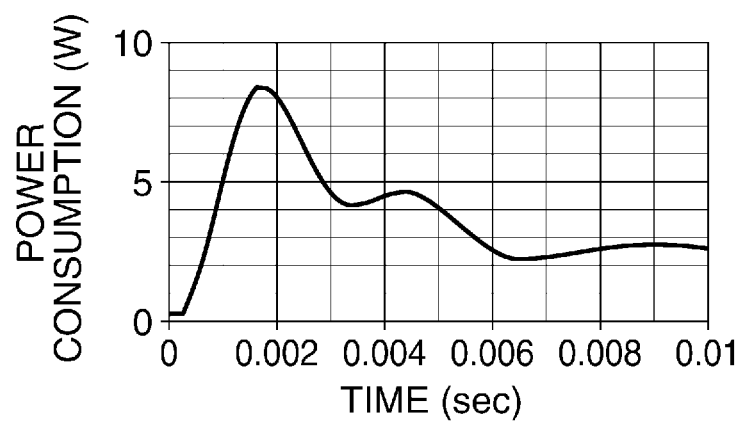

FIG. 14A to 14C showing the test results in a comparative example show variations with time in actual rotational speed, slip rate, and power consumption when the conventional control apparatus was used. When the vibration-type actuator 23 was driven using the conventional control apparatus, the frequency, pulse width, and phase difference were fixed at initial values. As is apparent from the figures, according to the conventional control method, a slip occurs on the frictional sliding surface of the vibrating body 6 and the friction member 4 during an acceleration period, and hence there is a great difference between the vibration converted speed indicated by broken lines and the actual rotational speed indicated by a solid line. At this time, the slip rate calculated by the comparative operating unit 115 was 56% at the maximum, and as a result, the power consumption reached its peak at 8.3 W.

Figure 14D:
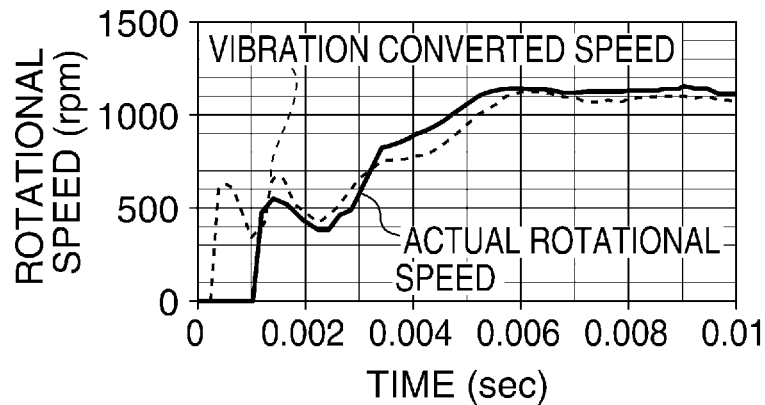
Figure 14E:
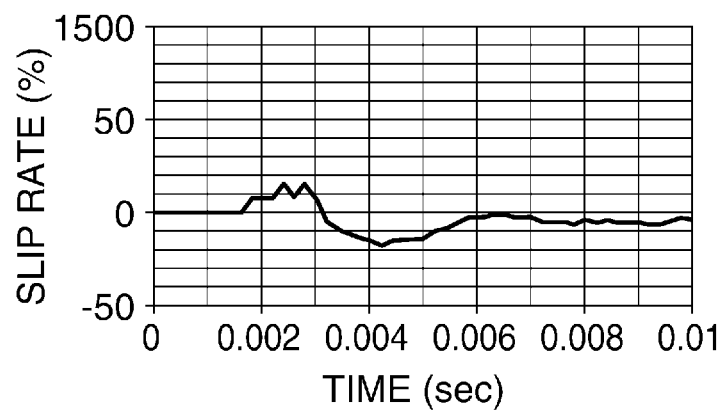
Figure 14F:
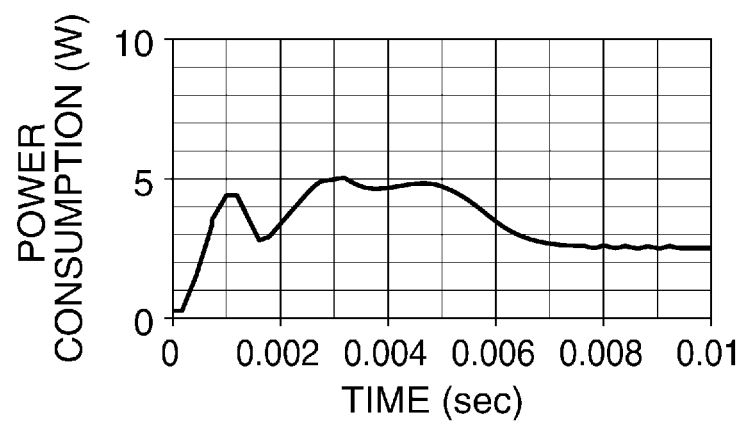

On the other hand, FIG. 14D to 14F showing the test results according to the present embodiment show variations with time in actual rotational speed, slip rate, and power consumption when the control apparatus 21 was used. When the vibration-type actuator 23 was driven using the control apparatus 21, the frequency computation unit 310 of the slip control unit 130 controlled the frequency based on the slip rate, but the pulse width and the phase difference were fixed at initial values. The amount of change in frequency Δf based on the slip rate was set at 400 Hz, and the frequency was controlled to linearly change within a range of 37.4 kHz to 37.8 kHz. As a result, the slip rate calculated by the comparative operating unit 115 was reduced to 17% at the maximum, and the peak of power consumption was reduced to 5 W.

As described above, in the present embodiment, the control apparatus 21 controls operation of the vibration-type actuator 23 so as to lower the rate of slip on the frictional sliding surface of the vibrating body 6 and the friction member 4. This reduces the occurrence of transitional slips on the frictional sliding surface of the vibrating body 6 and the friction member 4, improves driving efficiency, and reduces power consumption. On the other hand, when greater importance is placed on acceleration performance than on power saving, supplying electrical power required by the conventional control enables more rapid acceleration and deceleration and improves starting performance. Namely, it is possible to provide control with acceleration performance and deceleration performance and power consumption being well balanced according to uses for the vibration-type actuator 23.

It should be noted that although the slip rate which is the value (comparison result) representing a slip between the vibrating body 6 and the friction member 4 is calculated using the following equation, "slip rate=1−(actual rotational speed/vibration converted speed), a value (comparison result) representing a slip between the vibrating body 6 and the friction member 4 may be a difference obtained by subtracting the actual rotational speed from the vibration converted speed. In this case, when the difference is zero, this means that no slip is occurring, and as the absolute value of the difference increases, the degree of slip increases. Therefore, for the limiters 301, 401, and 501 of the frequency computation unit 310, the pulse width computation unit 410, and the phase difference computation unit 510, respectively, upper limits should be set based on a maximum value of the difference that is obtained empirically.

Moreover, vibration-type actuators that can be drivingly controlled by the control apparatus 21 are not limited to those having the structure in FIGS. 2A and 2B. For example, the present invention may be applied to a vibration-type actuator of a linear driving type which produces oval motions in an end of a projecting portion provided in a plate-shaped vibrating body to thus apply frictional driving force to a driven body which is being in pressure contact with the end of the projecting portion. The present invention may also be applied to a vibration-type actuator of an annular type which brings an annular driven body into pressure contact with an annular vibrating body and excites progressive waves traveling in a circumferential direction in the vibrating body to rotate the driven body. When the control apparatus 21 is applied to the vibration-type actuator of the linear driving type, a linear encoder should be used as a position sensor to detect relative speeds and relative positions of the vibrating body and the driven body when they are moving linearly in a predetermined direction.

The vibration-type driving apparatus 20 should not necessarily be applied to driving of a mirror in a digital single-lens reflex camera as described with reference to FIGS. 3A and 3B. For example, a mechanism for moving a zoom lens, a focus lens, and so forth of a digital single-lens reflex camera in a direction of a shooting optical axis by converting rotation of the output shaft 10 of the vibration-type actuator 23 into linear motions via a gear or the like may be constructed. Moreover, the vibration-type driving apparatus 20 may be used as a motor to be provided at an articulation of an articulated robot and may also be applied to a wide variety of electronic apparatuses equipped with components required to be positioned by driving using a vibration-type actuator.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-197200, filed Oct. 5, 2016 and Japanese Patent Application No. 2017-129431, filed Jun. 30, 2017 which are hereby incorporated by reference herein in their entirety.

What is claimed is:

1. A control apparatus for a vibration-type actuator which moves a vibrating body and a driven body relatively to each other, comprising:
   a vibration detecting unit configured to detect a vibration converted speed of the vibrating body based on a vibrating voltage generated in response to vibrations of the vibrating body, wherein the vibrating voltage is output by a sensor phase other than driving electrodes on the vibration-type actuator;
   a relative speed detecting unit configured to detect an actual rotational speed that represents a relative speed of the vibrating body and the driven body;
   an operating unit configured to obtain a comparison result obtained by comparing the vibration converted speed and the actual rotational speed; and
   a vibration control unit configured to control a vibration state of the vibrating body based on the comparison result.

2. The control apparatus according to claim 1, wherein the vibration control unit changes the vibration state of the vibrating body at least when the vibrating body or the driven body accelerates or decelerates.

3. The control apparatus according to claim 1, wherein the vibration control unit controls the vibration state of the vibrating body based on a value that represents a slip occurring between the vibrating body and the driven body obtained from the vibration converted speed and the actual rotational speed.

4. The control apparatus according to claim 3, wherein at least when the vibrating body or the driven body accelerates or decelerates, the vibration control unit obtains the value that represents the slip, and based on the value that represents the slip, changes the vibration state of the vibrating body.

5. The control apparatus according to claim 3, wherein when the value that represents the slip has increased, the vibration control unit reduces vibrations of the vibrating body.

6. The control apparatus according to claim 5, wherein when the value that represents the slip has decreased, the vibration control unit increases vibrations of the vibrating body.

7. The control apparatus according to claim 3, wherein at predetermined sampling intervals, the vibration control unit obtains the value that represents the slip, and based on the value that represents the slip, controls the vibration state of the vibrating body.

8. The control apparatus according to claim 3, wherein the vibration control unit obtains the value that represents the slip by subtracting from 1 a value obtained by dividing the actual rotational speed by the vibration converted speed, or by subtracting the actual rotational speed from the vibration converted speed.

9. The control apparatus according to claim 1, wherein the vibrating body comprises an electro-mechanical energy conversion element, and
   the vibration control unit controls the vibration state of the vibrating body by controlling at least one of the following:
   frequency, voltage value, and phase difference of a plurality of alternating-current voltages that is applied to the electro-mechanical energy conversion element.

10. The control apparatus according to claim 1, wherein the vibrating body comprises an electro-mechanical energy conversion element,
   the electro-mechanical energy conversion element comprises the sensor phase that outputs the vibration voltage, and
   the vibration detecting unit detects a magnitude of the vibration voltage output from the sensor phase.

11. The control apparatus according to claim 1, further comprising a current detecting unit configured to output a driving current,
   wherein the vibration detecting unit detects a magnitude of the driving current output from the current detecting unit.

12. A vibration-type driving apparatus comprising:
   a vibration-type actuator configured to move a vibrating body and a driven body relatively to each other; and
   the control apparatus for the vibration-type actuator according to claim 1.

13. The vibration-type driving apparatus according to claim 12, further comprising a position sensor configured to output the actual rotational speed.

14. An electronic apparatus comprising:
   the vibration-type driving apparatus according to claim 12; and a component configured to be moved by the vibration-type driving apparatus.

15. A control apparatus for a vibration-type actuator that moves a vibrating body and a driven body relatively to each other, comprising:
- a vibration detecting unit configured to detect a vibration converted speed of the vibrating body based on a vibrating voltage generated in response to vibrations of the vibrating body, wherein the vibrating voltage is output by a sensor phase other than driving electrodes on the vibration-type actuator;
- a relative speed detecting unit configured to detect an actual rotational speed that represents a relative speed of the vibrating body and the driven body;
- an operating unit configured to obtain a comparison result obtained by comparing the vibration converted speed and the actual rotational speed; and
- a vibration control unit configured to control a vibration state of the vibrating body based on the comparison result,
- wherein at least when the vibrating body or the driven body accelerates or decelerates, the vibration control unit obtains the comparison result, and based on the comparison result, changes the vibration state of the vibrating body.

16. A vibration-type driving apparatus comprising:
- a vibration-type actuator configured to move a vibrating body and a driven body relatively to each other; and
- the control apparatus for the vibration-type actuator according to claim 15.

17. An electronic apparatus comprising:
- the vibration-type driving apparatus according to claim 16; and
- a component configured to be moved by the vibration-type driving apparatus.

18. A control method for a vibration-type actuator that moves a vibrating body and a driven body relatively to each other, comprising:
- detecting a vibration converted speed of the vibrating body based on a vibrating voltage generated in response to vibrations of the vibrating body, wherein the vibrating voltage is output by a sensor phase other than driving electrodes on the vibration-type actuator;
- detecting an actual rotational speed that represents a relative speed of the vibrating body and the driven body;
- obtaining a comparison result obtained by comparing the vibration converted speed and the actual rotational speed; and
- controlling a vibration state of the vibrating body based on the comparison result.

19. A control method for a vibration-type actuator that moves a vibrating body and a driven body relatively to each other, comprising:
- detecting a vibration converted speed of the vibrating body based on a vibrating voltage generated in response to vibrations of the vibrating body, wherein the vibrating voltage is output by a sensor phase other than driving electrodes on the vibration-type actuator;
- detecting an actual rotational speed that represents a relative speed of the vibrating body and the driven body; and
- obtaining, at least when the vibrating body or the driven body accelerates or decelerates, a comparison result obtained by comparing the vibration converted speed and the actual rotational speed, and based on the comparison result, changing the vibration state of the vibrating body.

* * * * *